(12) United States Patent  (10) Patent No.: US 8,572,720 B1
Odom et al.  (45) Date of Patent: *Oct. 29, 2013

(54) SYSTEM, METHOD, AND DEVICE FOR COMMUNICATING AND STORING AND DELIVERING DATA

(71) Applicants: Wayne Odom, Tucson, AZ (US); Karolyn Gee, Tucson, AZ (US)

(72) Inventors: Wayne Odom, Tucson, AZ (US); Karolyn Gee, Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/898,460

(22) Filed: May 20, 2013

(51) Int. Cl.
  *H04L 29/06* (2006.01)
(52) U.S. Cl.
  USPC .......................................................... 726/14
(58) Field of Classification Search
  None
  See application file for complete search history.

(56) References Cited

U.S. PATENT DOCUMENTS

| | | | |
|---|---|---|---|
| 4,278,837 A | 7/1981 | Best | |
| 5,117,380 A | 5/1992 | Tanagawa | |
| 5,178,389 A | 1/1993 | Bentley et al. | |
| 5,184,830 A | 2/1993 | Okada et al. | |
| 6,135,887 A | 10/2000 | Pease et al. | |
| 6,251,014 B1 | 6/2001 | Stockdale et al. | |
| 6,339,815 B1 | 1/2002 | Feng et al. | |
| 6,369,827 B1 | 4/2002 | Pan et al. | |
| 6,389,462 B1 | 5/2002 | Cohen et al. | |
| 6,603,593 B2 | 8/2003 | Fidric et al. | |
| 6,606,337 B1 | 8/2003 | King | |
| 6,981,180 B1 | 12/2005 | Bailey et al. | |
| 6,981,278 B1 | 12/2005 | Minnig et al. | |
| 7,103,718 B2 | 9/2006 | Nickel et al. | |
| 7,233,890 B2 | 6/2007 | Shapiro et al. | |
| 7,278,031 B1 | 10/2007 | Best | |
| 7,308,567 B2 | 12/2007 | Yamamoto et al. | |
| 7,406,627 B2 | 7/2008 | Bailey et al. | |
| 7,698,555 B2 | 4/2010 | Jiang et al. | |
| 7,711,625 B2 | 5/2010 | Markel et al. | |
| 7,793,157 B2 | 9/2010 | Bailey et al. | |
| 8,250,631 B2 | 8/2012 | Iyengar et al. | |
| 8,270,420 B2 | 9/2012 | Wang et al. | |
| 8,301,789 B2 | 10/2012 | Morris et al. | |
| 8,407,777 B1 * | 3/2013 | John | 726/11 |
| 8,448,236 B1 * | 5/2013 | Odom et al. | 726/14 |
| 2001/0029205 A1 | 10/2001 | Taho et al. | |
| 2002/0028710 A1 | 3/2002 | Ishihara et al. | |
| 2002/0183119 A1 | 12/2002 | Fessler | |
| 2003/0050116 A1 | 3/2003 | Chen | |
| 2003/0064771 A1 | 4/2003 | Morrow et al. | |
| 2003/0195737 A1 | 10/2003 | Shapiro et al. | |
| 2003/0204601 A1 * | 10/2003 | Takano | 709/227 |
| 2003/0220141 A1 | 11/2003 | Corrigan et al. | |
| 2004/0153595 A1 | 8/2004 | Sukegawa et al. | |
| 2004/0242333 A1 | 12/2004 | Arakawa et al. | |
| 2005/0059482 A1 | 3/2005 | Hedrick et al. | |
| 2005/0081064 A1 | 4/2005 | Ooi et al. | |
| 2005/0107149 A1 | 5/2005 | Benbrahim et al. | |
| 2005/0130728 A1 | 6/2005 | Nguyen et al. | |
| 2005/0143456 A1 | 6/2005 | Defossa et al. | |
| 2005/0164789 A1 | 7/2005 | Nakamura et al. | |
| 2005/0181877 A1 | 8/2005 | Kuwahara et al. | |
| 2005/0216639 A1 | 9/2005 | Sparer et al. | |

(Continued)

*Primary Examiner* — Benjamin Lanier
(74) *Attorney, Agent, or Firm* — Robert Ryan Morishita; Morishita Law Firm, LLC

(57) ABSTRACT

A system, method, and device optionally includes a server that is isolated from open networks which assigns secure random socket connections, e.g., communication ports that have randomly selected addresses that are hidden from accessing devices. Optionally, the secure random socket connections are dynamically assigned, i.e., the secure random socket connections are closed and opened with each command to access data secured by the server.

20 Claims, 17 Drawing Sheets

(56) References Cited

U.S. PATENT DOCUMENTS

| | | |
|---|---|---|
| 2005/0240918 A1 | 10/2005 | Shlomai |
| 2005/0282627 A1 | 12/2005 | Hedrick et al. |
| 2006/0035707 A1 | 2/2006 | Nguyen et al. |
| 2006/0047880 A1 | 3/2006 | Lindblom et al. |
| 2006/0287109 A1 | 12/2006 | Mercado et al. |
| 2007/0070996 A1 | 3/2007 | Oran |
| 2011/0142062 A1 | 6/2011 | Wang et al. |

* cited by examiner

SYSTEM, METHOD, AND DEVICE FOR COMMUNICATING AND STORING AND DELIVERING DATA

RELATED APPLICATION DATA

The present application is a continuation-in-part of U.S. patent application Ser. No. 13/708,661, now U.S. Pat. No. 8,448,236, entitled "System, Method, and Device for Storing and Delivering Data, filed Dec. 7, 2012, which in turn, was a continuation-in-part of U.S. patent application Ser. No. 13/441,675, now U.S. Pat. No. 8,375,455, entitled "System, Method, and Device for Storing and Delivering Data," filed Apr. 6, 2012.

FIELD OF THE INVENTION

The present invention relates to data storage and delivery. More specifically, the present invention relates to a method, system, and device for storing and delivering data to a platform such as a computer, game console, cellular telephone, PDA, tablet device, or the like from a server.

BACKGROUND OF THE INVENTION

Data may be stored in many different forms and delivered to many different types of platforms. For example, movies, music, and games may be stored on a CD (or compact disc) or DVD (or digital versatile disc), which can be read by a personal computer, game console, or disc player for delivery to the user. The primary drawbacks of a physical format such as a CD or DVD are the portability of the disc, the portability of the player, the potential loss of the data if the disc is physically damaged, and the inability to control copying and piracy of the data. More recently, electronic formats have enabled movies, music, books, photographs, and games to be downloaded or streamed via the Internet or local area network ("LAN") to a device connected to a server that stores the data, such as media content. These electronic formats are usually more portable than physical media and the players used to view such electronic formats, such as PDAs (or personal digital assistants) and cellular telephones, are typically more portable than a disc player. However, electronic formats are generally very easy to copy, e.g. pirate.

Digital rights management ("DRM") schemes have been developed to control piracy. A common DRM measure is to only permit data to play on a registered device. For example, some data providers require the user to install proprietary software on the user's computer to download data then only allow the user to transfer the downloaded content to attached devices that are "registered" by the software. Since this data is only playable on registered devices (even if the user has a legitimate, paid-for copy of the data), the data will not play on, for example, a new device or a new computer until the user can change the settings on the user's account. Ultimately, however, this form of DRM is not closely tailored to the problem of copying and piracy because the user with a legitimate, paid-for copy of the data may be unduly burdened by the requirement to register each device to play the data while the user who wishes to pirate a copy of the data can easily find utilities online to "crack" the DRM and pirate the data, such as media content.

SUMMARY OF THE INVENTION

The present invention includes a system for storing and delivering data. According to an optional embodiment, the present system includes a platform, which could be software, hardware, or firmware. In an optional embodiment in which the platform is hardware, such as a general purpose computer, specific use computer, cell phone, handheld device, or the like, the platform has a platform processor. Optionally, the platform processor is physically associated with memory, such as random access memory ("RAM").

In one optional embodiment, the present invention includes a platform, which may take any physical form, that includes a platform processor physically associated, and in communication, with memory and a data storage physically separate from the memory and readable by the platform processor. The data storage stores, in non-volatile storage, an executable wrap securing data, an executable controller, and an executable sensor. The wrap is an executable program, or group of executable programs, that includes program instructions to copy the executable sensor and a sister of the executable controller to the memory. The data is secured in the wrap by the sister of the executable controller in the memory cooperating with the executable controller in the data storage to automatically and continuously permit or deny access by the platform processor to data protected by the wrap. In this manner, the data protected by the wrap are only accessible to the platform processor when both the sister of the executable controller in the memory and the executable controller in the data storage are accessible to the platform processor. Put another way, if either the executable controller in the data storage or the sister of the executable controller in the memory are missing, the data protected by the wrap cannot be accessed. More specifically, the data protected by the wrap must be accessed by the executable controller and passed to the sister of the executable controller so that the platform processor can access the data when it reaches the memory.

The executable sensor monitors at least one of the platform and the data storage for anomalies and, upon detecting an anomaly, deny access to the data secured by the wrap. In an optional embodiment, the executable sensor denies access to the data secured by the wrap by deleting the sister of the executable controller from the memory upon detecting an anomaly. In an optional embodiment, the platform includes at least one data port and a power supply that supplies power to the platform including the data storage. Moreover, the platform operates in an operating environment controlled by an operating system that allocates system resources of the platform. In one such optional embodiment, the anomalies monitored by the executable sensor may include: a data port open on the platform, the amount of power delivered to the data storage by the platform, access to system resources used by the executable controller, access to system resources used by the sister of the executable controller, and access to system resources used by the wrap.

Optionally, the wrapped data may only be accessible on a platform uniquely identified with the wrap. For example, in one optional embodiment, the sister of the executable controller stores a unique identifier of the platform in the executable controller such that the data protected by the wrap is accessible only to a platform processor associated with a platform with a unique identifier matching the unique identifier stored in the executable controller.

The present invention also includes embodiments of a method for storing and delivering data to a platform having a platform processor physically associated, and in communication, with memory. A data storage readable by the platform processor is provided. An executable wrap that protects data is stored in the data storage.

An executable controller and an executable sensor are stored in the data storage. The executable sensor and a sister of the executable controller are installed at the memory. The sister of the executable controller is executed from the memory by the platform processor. The sister of the executable controller cooperates with the executable controller at the data storage to automatically and continuously permits or denies access by the platform processor to the data protected by the wrap. In this manner, the data protected by the wrap is only accessible to the platform processor when both the sister of the executable controller in the memory and the executable controller in the data storage are accessible to the platform processor.

The executable sensor monitors at least one of the platform and the data storage for anomalies and, upon detecting an anomaly, denies access by the executable sensor to the data secured by the wrap. In one such optional embodiment, the executable sensor denies access by the platform processor to the data secured by the wrap by deleting the sister of the executable controller from the memory upon the executable sensor detecting an anomaly. In an optional embodiment, the platform includes at least one data port and a power supply that supplies power to the platform including the data storage. Additionally, the platform may operate in an operating environment controlled by an operating system that allocates system resources of the platform. In one such optional embodiment, the executable sensor monitors for at least one of: a data port open on the platform, the amount of power being delivered to the data storage by the platform, access to system resources used by the executable controller, access to system resources used by the sister of the executable controller, and access to system resources used by the wrap.

Optionally, the sister of the executable controller stores a unique identifier of the platform in the executable controller. The wrap only permits access to data protected in the wrap by a platform processor associated with a platform with a unique identifier matching the unique identifier stored in the executable controller.

In a further optional embodiment, a server communicates with the platform. In an optional embodiment, the server has a server processor in communication with server memory. A server data storage readable by the server processor stores a second executable wrap and a second executable controller. In an optional embodiment, the second executable wrap protects data.

In one optional embodiment, a sister of the second executable controller is installed at the server memory. The sister of the second executable controller is executed from the server memory by the server processor. The sister of the second executable controller at the server memory cooperates with the sister of the executable controller at the memory to automatically and continuously permit or deny access by the platform processor to the data protected by the second wrap at the server data storage. In this manner, the data protected by the second wrap is only accessible to the platform processor when the sister of the executable controller in the memory communicates with the sister of the second executable controller in the server memory.

In another optional embodiment, a sister of the second executable controller at the memory at the platform. The sister of the second executable controller is executed from the memory by the platform processor. The sister of the second executable controller at the memory cooperates with the sister of the executable controller at the memory to automatically and continuously permit or deny access by the platform processor to the data protected by the second wrap at the server data storage. In this manner, the data protected by the second wrap is only accessible to the platform processor when the sister of the executable controller in the memory communicates with the sister of the second executable controller in the memory.

The present invention also includes a system including a platform in communication with a server. A platform includes a platform processor physically associated, and in communication, with a memory and a data storage physically separate from the memory and readable by the platform processor. The data storage stores, in non-volatile storage, an executable wrap securing data, an executable controller, and an executable sensor. The wrap includes instructions to copy the executable sensor and a sister to the executable controller to the memory. Data are secured in the wrap by the sister of the executable controller in the memory cooperating with the executable controller in the data storage to automatically and continuously permit or deny access by the platform processor to data protected by the wrap. In this manner, data protected by the wrap are only accessible to the platform processor when both the sister of the executable controller in the memory and the executable controller in the data storage are accessible. The executable sensor monitors at least one of the platform and the data storage for anomalies and, upon detecting an anomaly, denies access to the data secured by the wrap.

A server includes a server processor physically associated, and in communication, with server memory and a server data storage physically separate from the server memory and readable by the server processor. The server data storage stores, in non-volatile storage, a second executable wrap securing data, a second executable controller, and a second executable sensor. The second wrap includes instructions to copy the second executable sensor and a sister to the second executable controller to the server memory. The data are secured in the second wrap by the sister of the second executable controller in the server memory cooperating with the second executable controller in the server data storage to automatically and continuously permit or deny access by the server processor to data protected by the second wrap. In this manner, the data protected by the second wrap are only accessible to the server processor when both the sister of the second executable controller in the server memory and the second executable controller in the server data storage are accessible. The second executable sensor monitors at least one of the server and the server data storage for anomalies and, upon detecting an anomaly, denies access to the data secured by the second wrap, wherein the data protected by the second wrap at the server data storage is only accessible to the platform processor by transferring data via the sister of the second executable controller in the server memory at the server transferring the data to the sister of the executable controller in the memory at the platform.

In one optional embodiment, the executable sensor denies access to the data secured by the wrap by deleting the sister of the executable controller from the memory upon detecting an anomaly. Similarly, in an optional embodiment, the second executable sensor denies access to the data secured by the second wrap by deleting the sister of the second executable controller from the server memory upon detecting an anomaly.

In an optional embodiment, a platform includes at least one data port and a power supply that supplies power to the platform including the data storage. Moreover, the platform operates in an operating environment controlled by an operating system that allocates system resources of the platform. In one such optional embodiment, the anomalies monitored by the executable sensor include at least one of: a data port open on the platform, the amount of power being delivered to the data storage by the platform, access to system resources used by the executable controller, access to system resources used by the sister of the executable controller, and access to system resources used by the wrap.

In an optional embodiment, the server includes at least one data port and a power supply that supplies power to the server including the server data storage. Moreover, in an optional embodiment, the server operates in an operating environment controlled by an operating system that allocates system resources of the server. In one such optional embodiment, the anomalies monitored by the second executable sensor include at least one of: a data port open on the server, the amount of power being delivered to the server data storage by the server, access to system resources used by the second executable controller, access to system resources used by the sister of the second executable controller, and access to system resources used by the second wrap.

Optionally, the sister of the executable controller stores a unique identifier of the platform in the executable controller. In one such optional embodiment, the data protected by the wrap are accessible only to a platform processor associated with a platform with a unique identifier matching the unique identifier stored in the executable controller.

Viewed from the server side of the system, embodiments of the present invention may include a data server with a data server processor, a data server communication device controlled by the data server processor, and a data server data storage readable by the data server processor. In an optional embodiment, the data server communication device is configured for selective communication with a connection server via ports assigned by the data server processor.

The data server data storage is adapted to store, in non-volatile storage, program instructions executable by the data server processor. Optionally, the data server data storage also stores secured data. In one such optional embodiment, the program instructions are executed by the data server processor to conduct a method. In an optional embodiment, the data server processor generates a polling signal and transmits the polling signal to the connection server via a polling port. In an optional embodiment, the polling signal is a regular or irregular periodic signal and the polling port is not a data port, i.e., the polling port is merely configured to transmit the polling signal and monitor for a response and is not configured to receive commands or transmit secured data.

As suggested above, the polling port is monitored for a reply to the polling signal from the connection server. The data server processor opens a secure random socket connection ("SRSC") for use by the data server communication device for communication between the data server and the connection server, but only in response to a reply to the polling signal from the connection server. The SRSC has an address randomly generated by the data server processor and the SRSC address is hidden from the connection server at least until after the SRSC has been opened by the data server processor. The data server processor establishes a connection to the connection server via the data server communication device using the SRSC opened by the data server processor. The data server communication device uses the SRSC to access a port at the connection server, whether the port at the connection server is an open port, a hidden port, or an SRSC (i.e., a port with a randomly-generated, hidden address). That is, in one optional embodiment, even though the connection server requested a connection to the data server, it is the data server that establishes the connection by (a) opening an SRSC and (b) connecting to the connection server via the SRSC at the data server. In an optional embodiment, the data server processor also authenticates the connection server after the reply to the polling signal is received. The form of authentication may vary depending on the embodiment.

The data server processor communicates with the connection server via the SRSC. In one such optional embodiment, the data server processor permits access to the secured data stored on data server data storage by the connection server via the SRSC. In another optional embodiment, the data server processor permits communication (such as email, voice over IP, voice over PSTN or cell network, SMS, messaging over IP, or the like) by allowing the connection server to use the data server via the SRSC.

In an optional embodiment, access by the connection server may only be gained via an SRSC. For example, in one optional embodiment, the data server communication device is configured to communicate only with one or more connection servers and, even then, only via an SRSC. In an additional or alternate optional embodiment, the data server communication device is physically connected only with one or more connection servers.

After access by the connection server to the secured data has occurred, the data server processor closes the SRSC. The amount of access allowed before closing the SRSC may vary depending on the embodiment. For example, in one optional embodiment, an SRSC closes after each command to access secured data has been completed, and a new SRSC must be assigned by the data server for the ensuing command.

In an optional embodiment, additional criteria may be defined for securing an SRSC. For example, in one optional embodiment, the data server processor monitors communication between the connection server and the data server via the SRSC. Such examples could include closing the SRSC if the communication is idle, if commands between the connection server and the data server via the SRSC include prohibited commands, or the like.

As described in greater detail below, a data server according to an embodiment of the present invention may be integrated into a system that includes one or more connection servers, each of which is in communication with one or more platforms. In such an optional system, a data server processor may perform the step of verifying, or assisting in verifying, the platform.

Another aspect of the present invention includes a method for permitting or restricting communication with (e.g., access to secured data or communications via) a data server by or through a connection server. In an optional embodiment, the data server has a data server processor, a data server communication device controlled by the data server processor and configured for selective communication with a connection server via ports assigned by the data server processor, and a data server data storage readable by the data server processor. In an optional embodiment, the data server communication device is configured for communication only with the connection server. The data server data storage is adapted to store, in non-volatile storage, program instructions executable by the data server processor to conduct a method. In a further optional embodiment, a data server may store secured data at a data server data storage.

In one optional embodiment, a method includes the data server processor generating, and transmitting to the connection server, a polling signal via a polling port. The data server processor monitors the polling port for a reply to the polling signal from the connection server. The data server processor opens an SRSC between the data server and the connection server only in response to receipt of a reply to the polling signal. As above, the SRSC has an address randomly selected by the data server processor and hidden from the connection server until after the SRSC has been opened by the data server processor. In an optional embodiment, the connection server is authenticated by the data server. In a further optional embodiment in which a platform is connected to the connection server, the data server authenticates, or assists in authenticating, the platform. In one such optional embodiment, a platform is authenticated, at least in part, by verifying an identifier associated with the platform.

For example, in one such optional embodiment, a platform stores an executable wrap on a data storage readable by the platform processor. The executable wrap stores, in non-volatile storage, an executable wrap securing data, an executable controller, and an executable sensor. The wrap includes instructions to copy the executable sensor and a sister to the executable controller to the memory of the platform. The data is secured in the wrap by the sister of the executable controller in the memory in cooperation with the executable controller in the data storage. Together, the sister of the executable controller and the executable controller automatically and continuously permit or deny access by the platform processor to data protected by the wrap by only allowing access by the platform processor to the data protected by the wrap when both the sister of the executable controller in the memory and the executable controller in the data storage are accessible. In such an optional embodiment, the platform processor can access only the sister of the executable controller and is prevented by the wrap from accessing the executable controller directly. Moreover, the executable sensor is monitors at least one of the platform and the data storage for anomalies and, upon detecting an anomaly, denies access to the data secured by the wrap by the executable sensor deleting the sister of the executable controller from the memory, thereby rendering the wrapped data inaccessible to the platform processor which can only access the wrapped data through the sister of the executable controller.

In one such optional embodiment, the connection server processor executes program instructions to generate an electronic receipt by the connection server and transmit the electronic receipt by the connection server to the sister of the executable controller. The sister of the executable controller transmits the electronic receipt to the executable controller. The electronic receipt is stored inside the wrap by the executable controller. In one such optional embodiment, the platform processor executes program instructions to store a unique identifier of the platform in the executable controller. In one such optional embodiment, the connection server processor receives the unique identifier from the platform during an initial set up and authorizes the platform by storing the unique identifier from the platform at the connection server. In one such optional embodiment, the platform is authenticated by the connection server by receiving the unique identifier from the executable controller at the platform and comparing the unique identifier to the unique identifier stored at the connection server. In an optional embodiment, the platform processor may be used to authorize multiple platforms. In one such optional embodiment, the platform processor stores a unique identifier of the platform in the executable controller and the connection server processor includes authorization for a plurality of platforms in the electronic receipt stored in the executable wrap at the platform. During an initial set up for each platform, the connection server receives a unique identifier from each platform within the plurality of platforms and authorizes each platform within the plurality of platforms by storing the unique identifier associated with each of the platforms at the connection server. Thus, any of the platforms may be authenticated by receiving the unique identifier from the executable controller of the platform and comparing the unique identifier to the unique identifiers stored at the connection server.

The data server and connection server communicate via the SRSC. In one such example, the data server processor permits access to the secured data stored on the data server data storage by the connection server via the SRSC. The data server closes the SRSC after communication with the connection server has occurred. For example, the SRSC may be closed by the data server after access by the connection server to the secured data stored at the data server has occurred. In an additional or alternate optional embodiment, communication between the connection server and the data server via the SRSC is monitored and the SRSC is closed when the communication is idle. In yet another optional embodiment, commands prohibited in communication between the connection server and the data server are defined. Commands between the connection server and the data server via the SRSC are monitored and the SRSC is closed when the commands include prohibited commands.

An embodiment of a system may include the platform, connection server, and data server as described above. For example, in an optional embodiment, a platform has a platform processor and a connection server communicates with the platform. The connection server has a connection server processor configured to execute program instructions. In one such optional embodiment, the program instructions include receiving a connection request at the connection server from the platform. The connection server authenticates the platform and opens a connection server port identified by a connection server port address. In an optional embodiment, the connection server port address is hidden from the authenticated platform until after the connection server connects to a data server via an SRSC. The connection server reconnects to the authenticated platform via the connection server port at the connection server address.

In an optional embodiment, a first firewall is dynamically configured. The first firewall may be interposed between the authenticated platform and the connection server. In an optional embodiment, the first firewall is configured to drop all connection requests directed to the connection server port address without replying to the connection requests directed to the connection server port address. In an additional or alternative optional embodiment, the first firewall is configured to drop all commands directed to the connection server port address from sources other than the authenticated platform without replying to the commands directed to the connection server port address from sources other than the authenticated platform. In an optional embodiment, the first firewall conceals the connection server port address. In an additional or alternate optional embodiment, the first firewall to misrepresent the status of the connection server port as closed. In an optional embodiment, the first firewall is dynamically extinguished when the SRSC (described in greater detail above and below) with the data server is closed. The connection server then receives commands from the platform via the interface.

A data server includes a data server processor, a data server communication device controlled by the data server processor and configured for selective communication with the connection server via ports assigned by the data server processor, and a data server data storage readable by the data server processor. In an optional embodiment, the data server communication device is configured for communication only with, and/or is physically connected only to, one or more connection servers. The data server data storage is configured to store, in non-volatile storage, secured data and program instructions executable by the data server processor. In one optional embodiment, the program instructions include the data server processor generating, and transmitting to the connection server, a polling signal via a polling port. The data server processor monitors the polling port for a reply to the polling signal from the connection server. In an optional embodiment, the reply is generated by the connection server as a result of at least one of the commands from the platform that is received at the connection server.

The data server opens an SRSC between the data server and the connection server only in response to receipt of the reply to the polling signal. The SRSC has an address randomly selected by the data server processor and hidden from the connection server until after the SRSC has been opened by the data server processor.

In an optional embodiment, the data server or connection server may dynamically configure a second firewall interposed between the connection server and the data server. In one such optional embodiment, the second firewall is configured to drop all connection requests directed to the secure random socket connection address without replying to the connection requests directed to the secure random socket connection address. In an additional or alternate optional embodiment, the second firewall is configured to drop all commands directed to the secure random socket connection address from sources other than the connection server without replying to the commands directed to the secure random socket connection address from sources other than the connection server. Again, the second firewall may conceal the port address of the SRSC and/or misrepresent the status of the SRSC port as closed. In an optional embodiment, the first firewall is dynamically extinguished when the SRSC (described in greater detail above and below) with the data server is closed.

The data server communicates with the connection server via the SRSC. For example, in one optional embodiment, the data server processor permits access to the secured data stored on the data server data storage by the connection server via the SRSC. In an optional embodiment, the data server processor authenticates the connection server prior to allowing access. In an optional embodiment, the connection server is configured to pass through or relay communications between the platform and the data server. For example, in one optional embodiment, the connection server transmits secured data accessed from the data server to the platform in response to at least one of the commands. The data server processor closes the SRSC after communication between the connection server and data server has occurred. For example, in one optional embodiment, the SRSC is closed after the connection server accesses secured data stored at the data server data storage.

In an optional embodiment, the data server processor monitors communication between the connection server (which optionally serves as a pass-through for commands from the platform) and the data server via the SRSC. In such an optional embodiment, the data server processor may be configured to close the SRSC on any of a variety of conditions, including when the communication is idle, when commands include prohibited commands, or the like. In an optional embodiment including a first firewall and/or a second firewall, the first firewall and/or the second firewall may be commanded to the connection server port address and the secure random socket connection address, as well as any stored communications, from the connection server after the secure random socket connection is closed.

In an optional embodiment, the system may also include a verification server that stores at least one user profile record. The verification server may be a connection server, data server, or a separate device from the connection server and data server within the system. In one such optional embodiment, the platform further includes a platform communication device in communication with the platform processor which, in turn, is adapted to communicate with the verification server. An authentication driver is provided on the platform with the authority to communicate with the platform processor and the platform communication device. The authentication driver transmits a verification request to the verification server via the platform communication device and receives a response to the verification request from the verification server based on a comparison by the verification server of the verification request and the user profile record. The authentication driver selectively blocks or allows communication between the platform processor and the platform communication device based on the response to the verification request.

DESCRIPTION

Figure 1:
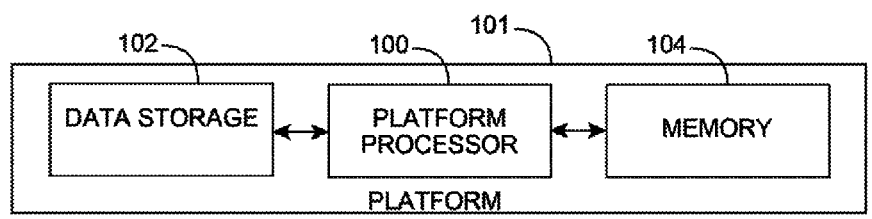
FIG. 1 is a block diagram of a system according to an embodiment of the present invention.

Reference is now made to the figures wherein like parts are referred to by like numerals throughout. Referring to FIGS.

1-4, a system, method, and device for storing and delivering data includes a platform 101. The platform 101 may be hardware, software, or firmware. For example, in one optional embodiment, the platform 101 is hardware having a platform processor 100 and memory 104. The platform 101 having a platform processor 100 could take many different forms including a general purpose computer, such as a personal computer or PC, a handheld device, such as a personal data assistant or PDA, a cellular telephone, a kiosk, a specific purpose gaming device, or any other type of device having a data processor. The functioning of the platform 101, platform processor 100, and memory 104 is described in greater detail below.

The present invention also includes a data storage 102 connected to the platform 101. The data storage 102 may be fixed to the platform 101, such as a hard drive; remote from the platform 101, such as a network file server, network storage, "cloud storage," or the like that connects to the platform via a computer network; or adapted to be removably connected to the platform 101, such as a flash drive, data card, removable hard drive, or the like that directly connects to the platform 101 rather than connecting to the platform via a network.

For example, in one optional embodiment, the data storage 102 is a hard drive that communicates with the platform processor 100 via a hard drive controller. In another example, the data storage 102 is cloud storage remote from the platform 101 that communicates with the platform processor 100 via a computer network. In another example, the data storage 102 is flash memory that is physically separate and removable from the platform processor 100 in that the data storage 102 communicates with the platform processor 100 through a serial port, such as a universal serial bus ("USB") port, a card slot, or other interface. In alternate optional embodiments, the data storage 102 may be a network-attached device or other remote device, or multiple networked or remote devices working in concert.

It is noted that in an optional embodiment, the data storage 102 may include other features and functions beyond data storage 102 functions. For example, in an optional embodiment, the data storage 102 may be integral with a cellular telephone, handheld device, PDA or the like that includes display and input functions. In such an optional embodiment, the data storage 102 may communicate directly or indirectly with an interface to display the data or data relating to the data and receive input for delivery of the data, such as media content.

In an optional embodiment, the data storage 102 stores data. The data is secured within an executable wrap. Generally, the executable wrap is a set (or collection of sets) of executable program instructions. In an optional embodiment, the wrap includes program instructions to carry out one or more of: providing an interface or menu to utilize the wrap functions; encrypting and decrypting data secured by the wrap; copying executable sensors to a memory 104 associated with a platform processor 100; and copying (or instructing an executable controller to copy) a sister to an executable controller into a memory 104.

In a further optional embodiment, a wrap may additionally generate an identifier (optionally a unique identifier) to identify the data storage 102 containing the wrap and/or assign (or read) an unique identifier for the platform 101 or platform processor 100 accessing the wrap. For example, the identifier for the data storage 102 may be generated using a software or firmware random number generator wrapped by the wrap or incorporated into the executable wrap or executable controller. Similarly, in an optional embodiment, the identifier for the platform 101 or platform processor 100 may include a serial number, IP address, network address, internet mobile equipment identity ("IMEI") number, media access control ("MAC") address, or other means for identifying the platform 101 or platform processor 100. In an optional embodiment, the identifier for the platform 101 or platform processor 100 may be stored in the wrap and may be used by the wrap to prevent the wrap from executing on platforms having a platform identifier that does not match the stored platform identifier. For example, in an optional embodiment, a unique identifier may be generated during an initial set up and stored in an executable wrap. In an optional embodiment, the unique identifier may be transmitted to a server 301 (such as a connection server 1002, described in greater detail below), where it may be stored and used in later verification of the platform 101 by the server 301 (e.g., connection server 1002). After an identifier has been received from the platform 101, further steps may be taken to register and authorize the platform, including receiving an authorization key from the server 301 (e.g., connection server 1002) directly, through alternative communications (such as email, short messaging service ("SMS") at a mobile phone, or other communication to the platform 101 or other device), or the like. In a further optional embodiment, the authorization key may be broken into multiple parts, with various parts delivered through different communications means and/or devices. In an optional embodiment, each platform 101 within a plurality of platforms may be required to be authorized separately using different wraps so that the unique identifier for that platform 101 may be stored within the wrap for that platform 101. In such an optional embodiment, the set up process may be repeated for each platform 101. For example, if a user desired to register and authorize a mobile phone, a tablet device, and a personal computer, the user would require three separate wraps, with a separate wrap installed on each platform 101. The set up process would be repeated for each platform 101 so that an identifier for that device and an authorization key for that wrap may be uniquely generated for each platform 101. In one such embodiment, however, multiple platforms may be registered from a single platform 101, with the multiple platform registration encoded into an electronic receipt (described in greater detail below). In such an optional embodiment, the initial process of registering the user and identifying (and paying for, in an optional embodiment in which a fee is charged for each platform 101 requiring a wrap) multiple platforms may be accomplished from a single platform 101, thus only leaving the set up on each platform 101 to install the wrap and authorize the wrap and the platform 101 through the generation of an identifier and authorization key for that platform 101.

As a general overview, the wrap secures data while an executable controller on the data storage 102 cooperates with a sister of the executable controller installed in the memory 104 to "unlock" the wrap so that it can be accessed at the platform 101, e.g., retrieve data from the wrap to be used, edited, viewed, or the like, at the platform, as well as save or store data at the platform in the wrap. In an optional embodiment in which the platform 101 communicates with a server 301, the server 301 may also include a sister to an executable controller in server memory 304 which cooperates with the executable controller executed from the data storage 102 to enable the server 301 to access the wrap. Sensors, running in the memory 104, monitor the platform 101 and/or server 301 (if provided) for any anomalies (described in greater detail below) and, upon detecting an anomaly, block access by a platform 101 and/or a server 301 (if provided) to the wrapped data. In one optional embodiment, access to the data is blocked by the sensors removing the sister of the executable controller from the memory 104. Since both the executable controller in the data storage 102 and the sister of the executable controller in the memory 104 are necessary to access the wrapped data in this optional embodiment, the sensors can block access to the data by blocking, deleting, or otherwise removing access to the sister of the executable controller in the memory 104.

In one such optional embodiment, the platform 101 includes a platform processor 100 and an associated memory 104. The memory 104 may store an executable controller executable by the platform processor 100 to control the flow of data to and from the data storage 102. In a further optional embodiment, the memory 104 may store an application, such as a video player, music player, photograph viewer, book viewer, game player, or the like that is executed by the platform processor 100 to play or display the data read from the data storage 102. The memory 104 may also be used temporarily in retrieving the data from the data storage 102 as well as confirming to the data storage 102 that the data storage 102 is connected to the platform.

In an optional embodiment, a server 301 having a server processor 300 and a server data storage 302 communicates with the platform 101. The server data storage 302 may include a record associated with the identifier stored on the data storage 102. When the wrap on the data storage 102 is mounted at the platform 101, the platform 101 may verify the data storage 102 by comparing the unique identifier stored at the data storage 102 with the record stored at the server 301 and, only if the data storage 102 is verified, transfers data to the platform 101. Optionally, as the data is delivered, a use record (described in greater detail below) may be stored at the server 301 and/or the data storage 102. In an optional embodiment, an electronic receipt may also be stored at the server 301 and/or the data storage 102. A purpose of the electronic receipt would be to provide a record of a transaction using the data storage 102 and/or the data stored thereon. For example, in an embodiment in which the data include media content, such as a movie, music, game, or the like, an electronic receipt may be stored in the use record to evidence the transaction in which the media content was purchased or rented and the use record may include an electronic record that the user had used the media content, e.g., viewed the movie, listened to the music, played the game, or the like. In such an optional embodiment, the electronic receipt and use record may, in combination, provide a history of the transaction. As noted above, the electronic receipt may also store the quantity of platforms registered to (and/or paid for by) the user for use. In an optional embodiment including a server 301, an electronic receipt may be stored at the server 301, optionally in server data storage 302, and in the wrap on the data storage 102 at the platform 101. These electronic receipts may enable resolution of disputes since, in this optional embodiment, the electronic receipt in the wrap on the data storage 102 may be secured by the wrap from tampering. In a further optional embodiment, the electronic receipt at the server 301 may likewise be secured from tampering with encryption, a wrap at the server 301, or the like.

In one optional embodiment, the data storage 102 stores an executable controller governing how the platform determines accessibility of the data by the platform. In such an optional embodiment, the data may be stored at a platform 101 and/or a server 301. The data in such an optional embodiment may be pre-stored at the platform 101 and/or the server 301, or may be loaded onto the platform 101 and/or server 301 through the programming instructions at the data storage 102, or may be loaded onto the platform 101 from the server 301 (or vice versa).

Additionally or alternatively, the data in the wrap at the data storage 102 may be readable by a platform processor 100. The data storage 102 containing the wrapped data may be readable or readable-writable. That is, the data stored in the wrap on the data storage 102 may be fixed, or may be changeable. For example, in one optional embodiment, data may be updated, exchanged, or supplemented by storing revised, different, or additional data. For example, in one optional embodiment, discussed in greater detail below, the data storage 102 may communicate directly or indirectly with a server 301 that delivers data to the data storage 102 such as through a file transfer or other communication protocol. Alternatively, the data storage 102 storing the data is readable only. In such an optional embodiment, the data may be fixed.

In one optional embodiment, the wrapped data may be encrypted in bulk and stored in the wrap by a loading program. In use, however, the wrap may act to decrypt the data when the executable controller and sister of the executable controller cooperate to access the data secured by the wrap. In a further optional embodiment, the wrap may encrypt the data going back into the wrap. For example, when saving or updating wrapped data, the updated data file may be passed by the sister of the executable controller to the executable controller and into the wrap where the wrap can encrypt the data file and, optionally, overwrite the outdated file. In an optional embodiment, the data secured by the wrap may be hidden from browsing at the platform 101. In one optional embodiment, so that the data secured by the wrap may only be viewed through the menu page of the wrap and accessed, i.e., read and written, via an executable controller in cooperation with a sister of the executable controller. In one such optional embodiment, the data in the hidden sub-components may not be browsed through the operating system of the platform, applications, application program interfaces, or the like, but rather can only be accessed by the wrap, executable controller, and sister of the executable controller which can display and access the contents of the wrap.

In another optional embodiment, an additional feature of using physically hidden areas in the data storage may be combined with the encryption. For example, in the example illustrated in FIG. 4, a data storage 102 may include a firmware area 406 and a flash memory area 422. The firmware area 406 may include a firmware controller 408, device mounting firmware 410 (e.g., firmware or, alternatively software, that communicates with an operating system to mount the device), a file-based command channel 412, and the like. In an optional embodiment, a security module 414 may function alone, or in part, to access data within the wrap and move data from inside the wrap to outside the wrap. The flash memory area 422 of the data storage 102 may be partitioned into sub-components, some of which may or may not be hidden from browsing at the platform, which contain the data as well as a use record, an executable controller, or the like. In one optional embodiment, the hidden sub-components may not be accessible, except through an executable controller described in greater detail elsewhere. Specifically, hidden sub-components may be configured such that the data in the hidden sub-components may not be browsed through the operating system of the platform, or the like, but rather can only be accessed by the executable controller which can locate and access the hidden sub-components. For example, in the optional embodiment of FIG. 4, a data hidden area 420 may contain data, such as media, executable programs, and the like, while a use record hidden area 418 may store a record of use history, credit history, or the like (as discussed below). Conversely, a read-only autorun 416 may be stored in a non-hidden area, thereby making the autorun file available without proceeding through an executable wrap. In an optional embodiment, the autorun may initiate a menu within the wrap to enable the wrap to install sensors, monitor the platform 101, install a sister to the executable controller, and thereby provide access to data secured in the wrap.

It is noted that the data may not necessarily all be contained in a single hidden sub-component or hidden area. That is, the data may be split among multiple sub-components. In one such optional embodiment, a file may be split, with separate segments stored in multiple different hidden sub-components. An executable controller may locate and access the hidden sub-components to deliver the data in a coherent order. Thus, when the file is played back by the platform processor, the data appears in order, even though it was accessed from multiple hidden sub-components in segments. In like manner, an executable game may exist in multiple parts in various hidden sub-components. In using the executable controller to access the executable game files, the platform processor may execute the executable game properly only when those executable game files are retrieved by the executable controller from the various hidden sub-components. This creates a substantial obstacle to hacking and copying since the data (e.g., data files, executable programs, executable games, and the like), is segmented into hidden sub-components which can only be accessed by the executable controller and, in fact, can only be located by the executable controller since the operating system, application program interfaces ("APIs"), applications, and the like are prevented from locating the hidden sub-components. Moreover, since the data is segmented, even if some of the hidden sub-components could be located and hacked, only a portion of the data stored therein could be compromised.

In either case, in one optional embodiment, the data storage 102 stores data in a single area or partition of the data storage 102 alone or with other additional data. In another optional embodiment, the data storage 102 is partitioned into multiple sub-components so that other data may be stored separately on the data storage 102 with the data in one sub-component and other data in a separate sub-component(s). For example, in certain optional embodiments, the data storage 102 is partitioned into one or more sub-components, with data stored in one of the sub-components. In an optional embodiment in which sub-components or areas are hidden, the data may be stored in a separate hidden area 420.

In an optional embodiment, the executable controller may "open," retrieve, then "close" the wrap only when needed so that the wrap is only "open" when data is read from, or written to, the wrap. Where the wrap contains sub-components, the sub-components of the wrap (whether physically hidden or not) are only opened as needed. In other words, in one optional embodiment, the executable controller only accesses the sub-component containing the data called for, and does not leave "open" any sub-components not currently being accessed. For example, if a media file is divided among twelve sub-components, the executable controller may accessed the sub-component containing the first segment of the media file and, after that first segment of the media file is cached, close the sub-component before accessing the sub-component containing the second segment of the media file. In this manner, a data sniffing program or other surreptitious data monitor may not be presented with an opportunity to access any data, other than the data being immediately accessed.

Figure 2:
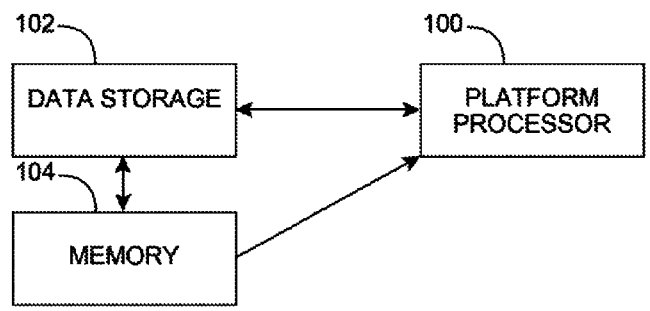
FIG. 2 is a block diagram of a system according to an embodiment of the present invention.
Figure 3:
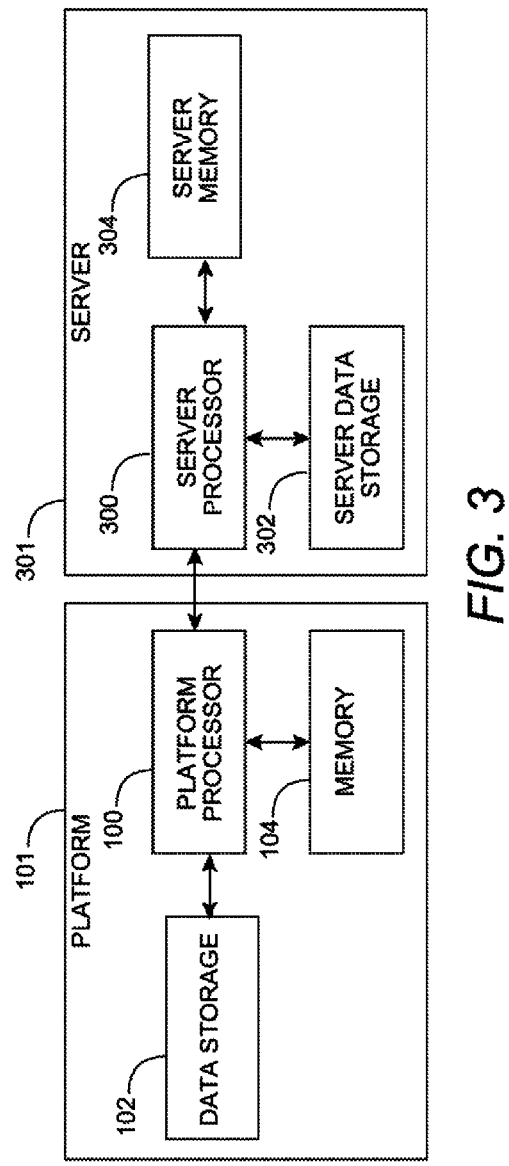
FIG. 3 is a block diagram of a system according to an embodiment of the present invention.

Referring generally to the optional embodiment of FIGS. 1-8, an executable controller executable by a platform processor 100 governs the use of the data and the relationship between the data storage 102 and a platform processor 100. In one optional embodiment, an executable controller or a sister of an executable controller is stored in memory 104. Optionally, the memory 104 is at the platform 101 as shown in FIGS. 1 and 3, although it is contemplated that the memory 104 could be part of the data storage 102 or associated with the platform 101, but not physically incorporated into the platform 101, as shown in FIG. 2. For example, in an optional embodiment, an executable controller is stored in a memory 104 physically associated with the platform processor 100, such as in random access memory ("RAM") associated with the platform processor 100. In yet another optional embodiment, the executable controller is stored in a more persistent data structure such as a hard drive, optical memory, magnetic memory, or the like at the platform 101. In optional embodiments in which the executable controller is stored in memory 104, an executable controller may be installed from the data storage 102. That is, in one optional embodiment, the data storage 102 stores an installer that installs an executable controller for controlling play of the data at the memory 104.

Figure 4:
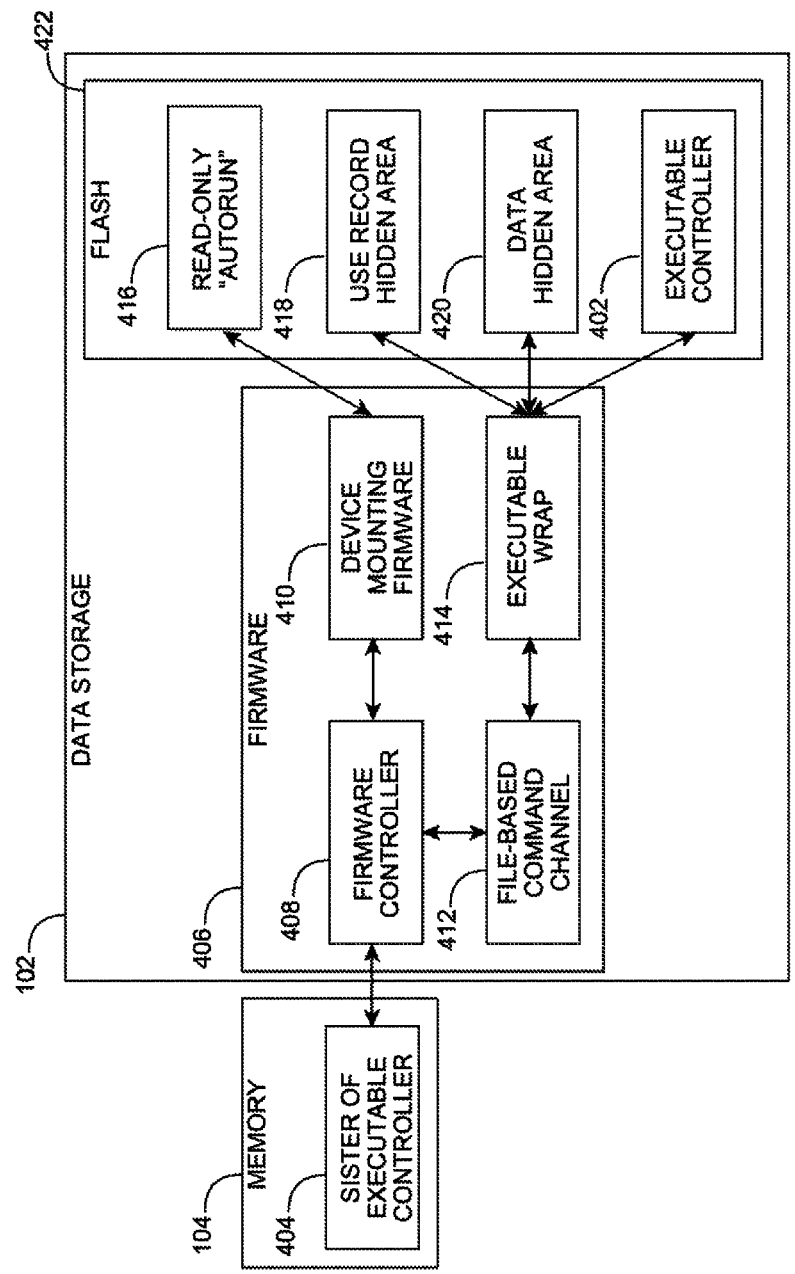
FIG. 4 is a block diagram of a device according to an embodiment of the present invention.
Figure 5:
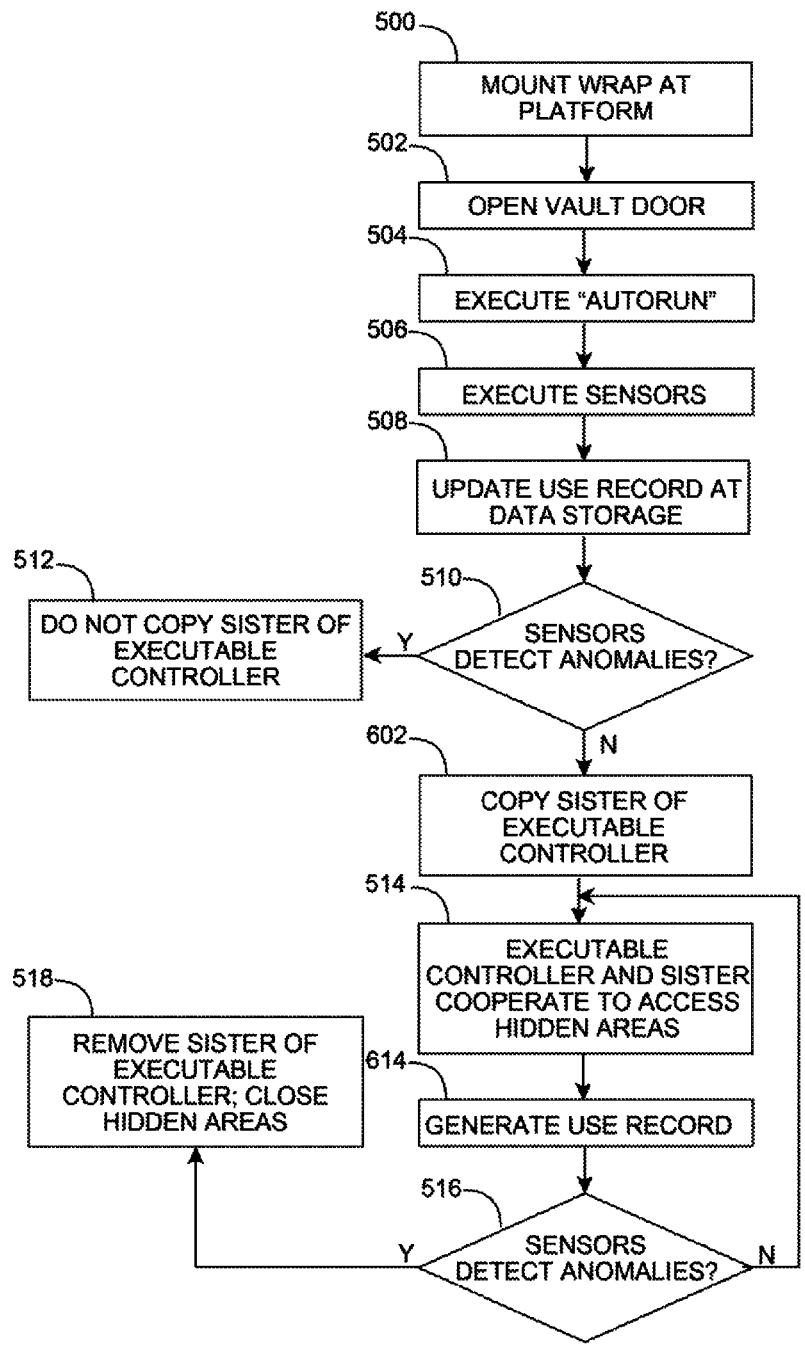
FIG. 5 is a flow chart of a method according to an embodiment of the present invention.

More specifically, in one optional embodiment illustrated in FIGS. 4 and 5, a sister of an executable controller 404 may be copied 602, e.g., installed, to memory 104 physically associated with a platform 101 from a data storage 102 when the wrap is mounted at a platform 101. In one such optional embodiment, the executable controller 402 stored on, and executed from, the data storage 102 works in cooperation with a sister to the executable controller 404 copied to, and executed from, memory 104. The copying of the sister to the executable controller may be controlled in any manner. For example, in an optional embodiment in which the data storage 102 is a fixed hard drive or removable data card, flash drive, or the like, the data storage 102 may store an executable "autorun" file 416 and data protected by a wrap. The platform 101 executes 504 the executable "autorun" which permits communication with the wrap. In an optional embodiment, the wrap may only be accessible through the executable "autorun." In one optional embodiment, the "autorun" extracts a menu from the wrap. As previously noted, in an optional embodiment, the menu may be extractable from the wrap only through the executable "autorun" and, thus, the options available through the menu may only be accessible after the "autorun" has executed. Specifically, in an optional embodiment, the wrap protecting the wrapped data may prevent access to the data inside the wrap by the operating system, applications, APIs, or the like, so that neither the menu nor the data may be accessed without the "autorun" first executing. The wrap may take many different forms, including an interface, encryption protocol, or the like. In an optional embodiment, the wrap is an executable program, e.g., an executable wrap, that only communicates with the executable "autorun" 416. As noted above, in an optional embodiment, a security module 414 may cooperate with the wrap to move data inside and outside of the wrap.

Within the wrap, i.e., among the wrapped data, is an executable controller 402. In an optional embodiment, the wrap instructs the executable controller to create 602 a "sister" of itself in the memory 104, e.g., RAM, of the platform 101. In another optional embodiment, the wrap instructs the executable controller to create a sister of itself in server memory 304 of a server 301. In yet another optional embodiment, the wrap instructs or authorizes a server 301 to create a sister of the executable controller in the memory 104 of the platform 101.

In one optional embodiment, the sister of the executable controller stored in, and executed from, the memory 104 of a platform 101 (or the server memory 304 of a server 301) is identical to the executable controller stored on, and executed from, the data storage 102. In another optional embodiment, the sister of the executable controller stored in, and executed from, the memory 104 of a platform 101 (or server memory 304 of a server 301) is not identical to the executable controller which is installed on the data storage 102, but the sister programs, that is, the executable controller stored on, and executed from, the data storage 102. In either optional embodiment, the sister of the executable controller 404 stored in, and executed from, the memory 104 of a platform 101 (or the server memory 304 of a server 301), cooperates 514 with the executable controller 402 stored on, and executed from, the data storage 102 and only transfer data to and from each other. Put another way, the executable controller running from the data storage 102 and the sister of the executable controller running from the memory 104 of a platform 101 (or server memory 304 of a server 301) only pass data to each other and these data are not accessible, and do not pass through, any other operating system, application, APIs, or the like. In this sense, the data of such an optional embodiment are secure from viewing or tampering through the operating system, applications, APIs, or the like. Thus, in an example directed to executable programs, such as an executable game program, the game program stored on the data storage 102 may be executed by the platform processor 100 only by passing data and commands through the executable controller and sister of the executable controller so that the data and commands are secure from sniffing or hacking, and the game program is not accessible for hacking or copying, through external programs, i.e., any program other than the executable controller or sister of the executable controller. In an optional embodiment, the executable controller and sister of the executable controller communicate directly and are continuously available to communicate, although it is contemplated that the sister of the executable controller and executable controller may not necessarily continuously communicate.

In an optional embodiment, this security may be enhanced using executable sensors. In an optional embodiment, the wrap contains executable software or firmware sensors which are copied to, and executed 506 from, the memory 104 of the platform 101 before the sister of the executable controller is created in the memory 104. The sensors may be configured to monitor 510 the platform 101 and/or data storage 102 for anomalies that may suggest that the operating environment is not secure. In an optional embodiment, the sensors may sense one or more of: (a) whether a debugger, data sniffer, or other spyware is operating (e.g., by detecting whether a port is open on the platform 101); (b) whether the data storage 102 is connected to the platform 101 (e.g., by detecting whether power is being delivered to the data storage 102 by the platform 101); and/or (c) whether any system resources, such as file directories, used by the executable controller, sister of the executable controller, "autorun," or wrap have been, or are being, accessed (which may suggest that hacking is being attempted). At the outset, any problems detected by the sensors may be communicated to the wrap, which does not copy 512 the executable controller to, or create the sister of the executable controller in, as the case may be, the memory 104 of the platform 101. Put another way, the sensors first determine whether the environment on the platform 101 is safe for the executable controller, or sister of the executable controller, as the case may be.

In an optional embodiment, another layer of security may be interposed between the "autorun" and the data processor at the platform 101. In one optional embodiment, such a "vault door" may prevent the platform 101 from executing the "autorun" until unprompted input is received, thereby opening 502 the vault door. By "unprompted," it is contemplated that the platform displays a desktop view or window view typical for any storage device and otherwise provides no prompting to the user for input. Thus, the user would need to know that input is needed since no prompt would appear, as well as the input called for. The vault door optionally monitors the input device, such as a keyboard, at the platform 101 for input and allows the "autorun" to execute after the input is received. In an optional embodiment, the input is a password, passcode, PIN, or other alphanumeric string. Alternatively, the input may be biometric data and the input device may be a fingerprint scanner, retina scanner, voice reader, or other biometric input device.

As noted above, in an optional embodiment, the executable controller stored on the data storage 102 may create or copy a sister of the executable controller stored in memory 104 physically associated with the platform 101. The operation of the executable controller and sister of the executable controller is described in greater detail below. In an optional embodiment, the sister of the executable controller is only temporarily stored in memory 104. In one such optional embodiment, the sensors discussed above may be used to determine whether the operating environment is secure. If the sensors determine 516 that the operating environment is not secure, the sister of the executable controller may be deleted 518 from memory 104. The deletion of the sister of the executable controller results in a stoppage of all wrapped data because both the sister of the executable controller and the executable controller are needed to access the wrapped data; without the sister of the executable controller, the wrapped data is inaccessible to the platform 101. In this sense, the sister of the executable controller may be termed a "ghost" program in that the sister of the executable controller only operates in cooperation with the executable controller and disappears, i.e., is deleted from the memory 104, if that cooperation is compromised.

The sister of the executable controller may also be termed a "ghost" program in that it may not be directly visible to the user. That is, in an optional embodiment, the sensors may monitor the resources used by the sister of the executable controller and the executable controller. In the event that a user attempts to view the sister of the executable controller or, in an optional embodiment, the files and/or directories used by the sister of the executable controller, it may disappear, i.e., be deleted from memory 104. In an optional embodiment, the data storage 102 may include a power source, such as a battery backup, to enable an executable controller stored on, and executed from, the data storage 102, to write the final data or commands received from the sister of the executable controller in the event that the sister of the executable controller disappears due to loss of power or loss of connection. In such an optional embodiment, disconnecting or removing the data storage 102 or shutting off the power to the platform 101 and/or the data storage 102 would not be effective to cancel the most recent transaction, data transfer, command, or the like communicated between the sister of the executable controller and the executable controller. As discussed above, the final (or most recent action) prior to disconnection, loss of power, loss of signal, or the like, may be written to an electronic receipt and/or a use history that is secured by the wrap.

To summarize briefly, in one optional embodiment, data are stored on a data storage 102 and secured by a wrap. The data may include an executable controller that is stored on, and executed from, a data storage 102 in cooperation with a sister of the executable controller stored in, and executed from memory 104. Where the wrapped data stored at the data storage 102 includes an executable program, such as a game program, the game program can thus be executed from the data storage 102 without storing the game program in the memory 104 associated with the platform processor 100 through data and commands sent by the executable controller to the sister of the executable controller.

More broadly, any data stored in the wrap may be secured by the wrap and accessible only by the sister of the executable controller in cooperation with the executable controller, thereby securing the data from, for example, viruses or trojans which would be blocked from reading the wrapped data or writing malicious code into the wrapped data. Similarly, the wrapped data would be secured from, for example, hacking by attempting to read the data storage 102 remotely because the remote device would lack the sister of the executable controller and, therefore, be denied access to the wrapped data. Moreover, the wrapped data may be secured from tampering because the wrap and/or executable controller may include parameters defining the data files that may be overwritten or altered and, therefore, could be configured to block the platform 101 from altering certain files, even if the platform 101 is otherwise permitted to read and view the files. For example, as discussed above, in an optional embodiment an electronic receipt, use history, and the like may be secured by the wrap. In an optional embodiment, the electronic receipt, use history, or the like may be viewable at the platform 101 (for example, through the menu page initiated by the autorun), but the wrap may block the platform 101 from writing, overwriting, or altering the electronic receipt.

In an alternate optional embodiment, the executable controller is stored at, and executed from, the data storage 102 without storing an executable controller at the memory 104 physically associated with the platform processor 100. In other words, rather than installing the executable controller on the platform, the executable controller may be executed from the data storage 102. In this optional embodiment, a sister or other copy of the executable controller may not be installed on the memory 104 of the platform 101.

Referring generally to FIGS. 1-8, the executable controller, and optional sister of the executable controller, may include various components for the operation of the platform processor 100 and the data storage 102. Generally, the executable controller may include such features as security and/or data integrity procedures, record keeping procedures, or the like. In one optional embodiment in which the data includes a game, the executable controller stored may include a random number generator or some other means for generating a random number. As may be appreciated, a random number generator may take many different forms and may generate random numbers in many different ways. In an optional embodiment, the random number generator is stored in the memory 104 separate from the game of chance stored on the data storage 102 so that the game of chance can only be conducted when the data storage 102 is connected to the platform 101.

In one optional embodiment, the executable controller may also secure certain data from tampering by encrypting the data, preventing the platform processor 100 from overwriting or altering the data, or the like. For example, when the wrap is mounted at the platform 101, the areas of the wrap storing data may be "unlocked" so that it can be read from the data storage 102 by the platform processor 100 via the executable controller and, optionally, the sister of the executable controller, and other secure writable areas of the wrap may be "opened" so the platform processor 100 can write to the data storage 102 via the executable controller and, optionally, the sister of the executable controller.

In an optional embodiment, readable areas of the wrap may be locked and writable areas of the wrap may be closed under one or more of a variety of circumstances. In one optional embodiment, the wrap is locked and closed whenever data is neither being read from or written to the data storage 102. Thus, as suggested above, the wrap is not left unlocked and open when it is not in use; rather, it is closed and locked when it is not in use. As discussed above, a wrap may include sensors, e.g., program routine(s), to determine the connection status between the platform processor 100 and the data storage 102, an monitor the memory 104 (whether RAM, hard drive, or the like) physically associated with the platform processor 100, the power received by the data storage 102 from the platform, or the like, to ensure that the wrap only unlocks readable sub-components and opens writable sub-components when the sensors do not detect any anomalies. Moreover, in an optional embodiment, the sensors may trigger the removal of the sister of the executable controller from memory 104 upon detection of an anomaly such that the platform 101 is disabled from accessing the wrapped data as discussed above. In yet a further optional embodiment, the data storage 102 may be removable from the platform 101 (such as a portable memory card, drive, or the like). In one such optional embodiment, the wrap may be locked and the secure areas or sub-components of the data storage 102 may be closed when the data storage 102 is removed from the platform.

In one optional embodiment, when the wrap stored on the data storage 102 is mounted at the platform 101 (e.g., the autorun starts, installs sensors to ensure the platform 101 is safe, and runs the wrap menu) the executable controller, which is either executed from the data storage 102 or executed through a sister to the executable controller copied to memory 104 local to the platform processor 100, causes the platform processor 100 to assign the data storage 102 a unique identifier. Optionally, the unique identifier is randomly generated by the platform processor. In another optional embodiment, the data storage 102 is preassigned a unique identifier, such as when the data storage 102 is created or prior to distribution of the data storage 102 to the player, and the unique identifier is stored on the data storage 102. In an optional embodiment, the unique identifier may also be stored on the platform 101. In one such optional embodiment, the wrap on the data storage 102 may be executed only on the platform 101 storing the unique identifier for that data storage 102, thereby tying the platform 101 to the data storage 102 and preventing the wrap on the data storage 102 from being used with any other platform 101. Similarly, the wrap may identify the platform 101, in any of a variety of ways, such as by using a serial number, IMAP address, MAC address, IP address, or the like, and store the platform identifier in the wrap. In this manner, the wrap may ensure that the wrap is used only at a specific platform 101, such as the platform 101 on which it was originally opened.

In a further optional embodiment, a key, such as a password, a pass code, a PIN, the unique identifier generated, or the like, is installed by the executable controller on both the data storage 102 and the platform processor 100 executing the executable controller. In a further optional embodiment, the executable controller encrypts the key.

Optionally, a key is used in combination with the unique identifier assigned to the wrap to verify the source of the data while conducting any transactions involving wrapped data. For example, in an optional embodiment described in greater detail below, the executable controller executed from the data storage 102 by the platform processor 100 may direct the platform processor 100 to write data, such as a use record or other media play data, to the data storage 102. In one such optional embodiment, the data written into wrap on the data storage 102 may be verified using the key and/or the identifier. For example, an electronic receipt written into the wrap on the data storage 102 may be uniquely identified based on the key, the identifier of the wrap (or data storage 102), the platform identifier, a server identifier, if any, or any combination thereof. In another example, the key and/or identifier assigned to the data storage 102 is used to access or "unlock" a record stored remote from the data storage 102, such as at a server 301.

As discussed above, in an optional embodiment, the data storage 102 may additionally be writable. In an optional embodiment, a wrapped sub-component 404 of the data storage 102 is writable. In one such optional embodiment, the executable controller executed by the platform processor 100 direct the platform processor to write a use record to the data storage 102 as data is read from the data storage 102. In one such optional embodiment, the executable controller is executed from the data storage 102, without installing the executable controller into the memory 104 physically associated with the platform processor 100 or by copying a sister of the executable controller to the memory 104 physically associated with the platform processor, to cause the platform processor 100 to write a history, e.g., a use record, transaction record, electronic receipt, or the like, at the data storage 102. It is contemplated that, although the executable controller may not necessarily be installed at the memory 104, the executable controller may temporarily borrow the memory 104, such as the RAM or hard drive, associated with the platform processor 100 as the executable controller is executed. In an alternate optional embodiment, in which a sister of the executable controller is installed in the memory 104, the sister of the executable controller may transfer history data directly to the writable areas of the data storage 102 either with or without cooperation of the executable controller stored on, and executed from, the data storage 102.

For example, in one optional embodiment, a play limit may be pre-written to a use record stored at the data storage 102. In one such example, the data storage 102 may be loaded with a balance of time or play before it is distributed to the player. In another optional embodiment, the platform processor 100, optionally under the direction of the executable controller or an optional server 301, may write a play limit to a use record stored at the data storage 102. In one such example, the data storage 102 may be loaded with a balance of time or play when the data storage 102 is first connected to a platform and the player directs the loading.

Optionally, the data storage 102, or the sub-component of the data storage 102, that stores the use record, and any electronic receipts that are part of the use record, is secure. For example, in one such optional embodiment, the use record is stored in the wrap. In another example, the use record is stored in a write-once-read-many ("WORM") storage such that once written, the use record cannot be rewritten or altered. In another optional embodiment, the data storage 102 is read-write memory ("RWM"), but the executable controller, working alone or in combination with the key and/or identifier, may limit or prevent access to the use record data by the platform processor 100, server 301, or the like as well as the ability to rewrite or alter the use record. For example, in an optional embodiment including a server 301, the platform processor 100 may be restricted from writing, rewriting, or altering the use record, electronic receipts, or the like stored at the data storage 102 until instructed to do so by the server processor 300 at the server 301. In any of these optional embodiments, it may be the executable controller in cooperation with the sister of the executable controller that read the use record from the data storage 102 for use by the platform processor 100, server 301, or the like. It is noted here that in an optional embodiment in which the platform processor 100 communicates with a server 301, described in greater detail below, the use record and any electronic receipts may be stored at a server data storage 302 in addition to, or in place of, the data storage 102.

Similarly, a use record and/or electronic receipt may be generated by the platform processor 100 as the platform processor 100 reads the data from the data storage 102. In an optional embodiment, the use record and/or electronic receipt may be written to the data storage 102 by the platform processor 100 under the direction of the executable controller. As described above, the integrity of the use record and any electronic receipts may be secured. As above, the use record and any electronic receipts may be preserved by storing the use record and/or electronic receipts within the wrap. In another optional embodiment, the use record and any electronic receipts may be preserved by using WORM storage or the executable controller may limit or prevent access to the use record using security measures such as encryption, use of the key and/or the identifier, or other security measures as well as the ability to rewrite or alter the use record.

For example, in an optional embodiment including a server 301, the platform processor 100 may be restricted from writing, rewriting, or altering the use record stored at the data storage 102 until instructed to do so by the server processor 300 at the server 301. In any of these optional embodiments, it may be the executable controller that reads the use record from the data storage 102 for use by the platform processor 100, server 301, or the like. As with the use record, in an optional embodiment in which the platform processor 100 communicates with a server 301, the use record may be stored at a server data storage 302 in addition to, or in place of, the data storage 102.

In an optional embodiment in which a use record is stored, various events of may be included in the use record. The use record may include a credit history and a use history. It is contemplated that in such an optional embodiment, the credit history and use history may be stored together or separately, e.g., in separate sub-components of a data storage 102. In an optional embodiment, the use history may store events relating to the data stored on the data storage 102. For example, in one optional embodiment, the number of times the data is read from the data storage 102 (e.g. the number of times the data is played), or the time duration the data is read from the data storage 102 (e.g. the duration that the data is played), or the time window during which the data is read from the data storage 102 (e.g. the day or time of day that the data is played), or the like, may be recorded in the use record. In such an optional embodiment, the use record may track whether the data has been read from the data storage 102 and, based on the use record, the executable controller may determine whether the data is available to be read from the data storage 102 by the platform processor 100. In an optional embodiment, the use record may optionally be updated as the data is read from the data storage 102 by the platform processor 100. Data stored in a credit history section of a use record may determine the eligibility to read data from the data storage 102. For example, in an optional embodiment in which the data include media content, the credit history may store the amount of time (e.g., available for three days) or the number of "plays" (e.g., available for one viewing) associated with the data. Similarly, in an optional embodiment in which the data include a playable game program, the credit history may store the amount of money, whether "real" or "fictional" money, available for use in playing the game (e.g., $100.00 balance) or the number of plays (e.g., thirty games) associated with the data. It is contemplated that the use record, including any credit history section and use history section, may be updated, optionally in real time, as data are accessed from the data storage 102. For example, a credit history may be debited by amounts used in a game, plays, viewings, time, or the like, and the use history may record the event such as by writing the viewing time, game play event(s), game play outcome, or the like.

It is contemplated that the player or viewer for playing or displaying the data at the platform may be part of the executable controller stored at, and optionally executed from, the data storage 102 or may be a separate program stored at the memory 104 associated with the platform processor 100. That is, in one optional embodiment, the platform processor 100 may read the data from the data storage 102 for play or display by a player or viewer on the platform and distinguishable from the executable controller stored on the data storage 102.

As noted above, the device of the present invention may be part of a system according to an optional embodiment of the present invention. In such a system, a platform 101 may have a fixed or removable data storage 102. In an optional embodiment, the platform processor 100 is physically separate from the data storage 102. The system further includes a memory 104 physically associated with the platform processor 100 and a data storage 102 storing the data, such as media content. As noted above, the memory 104 may be physically associated with the platform processor 100, such as RAM or a hard drive used by the platform processor 100, or may be physically associated with the data storage 102, such as a partition or sub-component of the data storage 102, or may be remote from the platform 101, such as on a networked server 301. In one optional embodiment, the data storage 102, or a sub-component thereof, stores an installer that installs an executable controller, a copy of an executable controller, or a sister of an executable controller on a memory 104 associated with the platform processor 100, e.g. RAM, hard drive, or the like. In this manner, the data storage 102 may contain all the components needed for a platform 101 to use the data storage 102 and read the data stored thereon. In an alternate optional embodiment, the executable controller may be executed directly from the data storage 102 without the need for installation from the data storage 102 to the memory 104.

In a further optional embodiment, a server 301 may be provided. It is contemplated that the server 301 could take many different forms and perform any of a plurality of tasks such as storing files for transfer to and from the platform processor 100, storing the executable controller for operation of the platform processor 100, extracting data such as use record, or the like from the platform processor 100 or data storage 102, or other tasks. In one such optional embodiment, a server 301 may include a server processor 300 and a server data storage 302. Optionally, the server data storage 302 includes one or more records associated to a data storage 102. In an optional embodiment in which the executable controller randomly generate an identifier for the data storage 102, records associated with a data storage 102 may be identified by the identifier for that data storage 102. In one optional embodiment, the address of the server 301 may be hidden from the user by storing the server address inside the wrap. In such an optional embodiment, the executable controller and sister of the executable controller may read the server address from the wrap and establish the connection (optionally through a connection application, browser, file transfer protocol ("FTP") application, communication client, media player, or the like) between the platform 101 and the server 301 without revealing the server address.

Referring to FIGS. 1-8, in use, the data storage 102 is placed in communication with the platform processor 100. As noted above, the data storage 102 is optionally a removable or fixed device, such as a flash memory connecting through a USB port. In such an example, the data storage 102 is placed in communication with the platform processor 100 by connecting to the port. In other examples, the data storage 102 may be a memory card, wireless device, wireless telephone or handheld device, or the like. In such optional examples, the data storage 102 may be placed in communication with the platform processor 100 using a wired or wireless communication link.

The executable controller governing use of the data storage 102 may be pre-loaded in memory 104 associated with the platform processor 100 at the platform 101. In an optional embodiment, a sister of an executable controller may be installed 602 in the memory 104 using an installer. The sister of an executable controller may be installed in memory 104 each time the data storage 102 is connected to the platform processor 100 at the platform 101 or, in an alternate optional embodiment, may persist in memory 104. In a further optional embodiment, the sister of an executable controller may be installed in server memory 304 (such as RAM) physically associated with a server processor 300 in place of, or in addition to, a sister of an executable controller installed in memory 104 at the platform 101. For example, in an optional embodiment, the sister of an executable controller may be installed in server memory 304 at a server 301 when a data storage 102 is connected to a platform 101 in communication with the server 301, thereby rendering the platform 101 merely a display device, input device, or otherwise a "dumb" terminal, with data processing occurring at the server processor 300 using data passed between the data storage 102 and the server memory 304 by the executable controller in the data storage 102 cooperating with the sister of the executable controller in the server memory 304. The installer could be received from, and operate through, any medium. For example, in one optional embodiment, the installer is stored on a computer readable medium, such as a compact disc ("CD"), digital versatile disc ("DVD"), floppy disc, or the like, that is separate from the data storage 102. In another example, the installer may be downloaded from a networked device, such as a file server or the like. In yet another optional example, the installer may be stored on the data storage 102. As noted above, the installer may be stored on a separate sub-component from any sub-component storing games of chance and any sub-component storing any writable credit and use record data.

In these optional embodiments, the installer installs 602 the executable controller or a sister of the executable controller. In an optional embodiment in which the data storage 102 is portable, that is, can be ported to different platform processors 100, the installer may install the executable controller or sister of the executable controller each time the data storage 102 is placed in communication with a platform processor 100 for which the executable controller have been previously installed. It is also contemplated that "portable" may optionally include attributes such easily disconnected and physically removable from the platform as well as easily carried. In an optional embodiment, the data storage 102 may be assigned a unique identifier. A file containing the unique identifier may be stored on a platform 101 and the "autorun" and/or wrap may be configured so that only the data storage 102 with a unique identifier corresponding to the unique identifier stored on the platform 101 operates on that platform 101. For example, in an optional embodiment, a platform 101 may uniquely correspond to a data storage 102 so that data storage 102 devices cannot be swapped and used in a different platform 101.

In another optional embodiment, the executable controller may be stored on, and executed from, the data storage 102. Such an optional embodiment may be directed to an application where it is desired not to store any data or executable controller on a memory 104 physically associated with the platform processor 100. In yet another optional embodiment, illustrated in FIG. 7, the executable controller may be stored on a server 301 and, thus, may not need to be installed or re-installed as the data storage 102 is ported to different platform processors 100.

The data storage 102 may be pre-loaded with a use record and/or data or the like. In another optional embodiment, on the first use 600 of the data storage 102, the user may need to establish 604 a use record and/or obtain data before using the data, such as media content. Where the data includes interactive features, such as a game, it is noted that the present invention may be directed for wagering games in which the use record stores credits that are backed by money, or for entertainment games in which the use record stores credits that are fictional, i.e. not backed by money. Where the credits are fictional, use record stored at the data storage 102 may be pre-loaded with credits or may be enabled to add credits to the use record upon request.

In an optional embodiment, the use record may include a play limit that determines the availability of the data, such as media content. For example, the data may be available for a defined amount of time (including an infinite amount of time), a defined quantity of plays or viewings (including an infinite quantity of plays or viewings), a defined window of time (including an infinite window of time), or the like. For example, a use record could make data available for a twenty-four hour period, two viewings, twelve hours of play, unlimited viewings, unlimited viewings until Jan. 10, 2012, unlimited play until the stored credits are exhausted, or any other play limit.

In an optional embodiment, the play limit may be extended. In an optional embodiment, the play limit may be extended through a financial transaction to purchase additional time, viewings, play, or the like. For example, in one such optional embodiment, the executable controller directs the platform processor 100 to communicate with a server. A user modifies 604 a use record through a transaction with the server, such as by adding time, credits, views, plays, or the like in a transaction that is financial or otherwise. In one optional embodiment, illustrated in FIG. 6, the use record is stored 610 at the data storage 102. In another optional embodiment, illustrated in FIG. 7, the use record may be stored 702 at the server and may optionally be communicated 704 to the data storage 102, memory 104 associated with the platform processor 100, or a combination thereof. For example, a sister of an executable controller may be stored in server memory 304 at a server. The sister of an executable controller may communicate to an executable controller at the data storage 102, bypassing any program instructions executed by the platform processor 100, to directly write to the writable sub-components of the data storage 102.

Referring generally to FIGS. 1-8, where the data storage 102 and/or the server 301 store a use record, placing the data storage 102 in communication with a platform processor 100 may trigger one or more security checks, optionally through the wrap discussed above, to ensure that the use record has not been tampered with. For example, a key or an identifier (both of which may have been generated 606 upon the first use of the data storage as discussed above) may be used to verify that the data storage 102 is authentic and that the data have not been altered since the prior use. In an optional embodiment using a server 301, records stored at the data storage 102 may be checked against records stored at the server 301.

Figure 7:
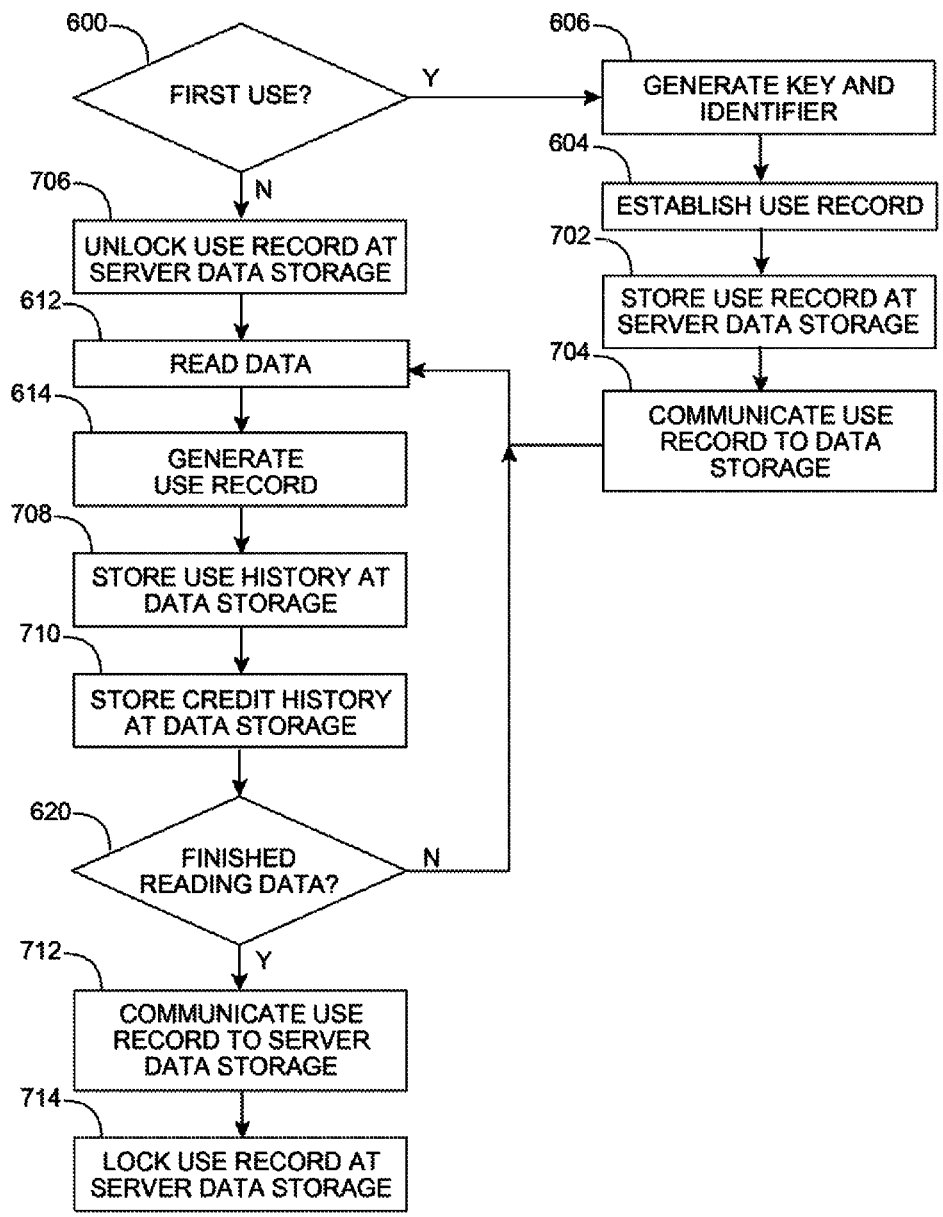
FIG. 7 is a flow chart of a process carried out by a system and device according to an embodiment of the present invention.

As noted above, in an optional embodiment, illustrated in FIG. 7, a use record may be stored at a server 301. Optionally, the use record stored at the server 301 duplicates the use record stored at the data storage 102. For example, in one such optional embodiment, placing the data storage 102 in communication with the platform processor 100 enables the executable controller or sister of the executable controller to "unlock" 706 the use record at the server data storage 302 associated with the data storage 102. Optionally, the use record at the data storage 102 and the server data storage are reconciled 708 so that the use records at both locations match. Continuing with such an optional embodiment, the use record may optionally be temporarily stored 710 at the data storage 102. During play of the data the use record at the data storage 102 may be updated 712 one or more times. At a predetermined time, such as when the data is finished, the record is "locked" 714 until the next game play. In similar fashion, a use record could be stored at memory 104 associated with the platform processor 100, e.g. the use record could be stored, unlocked (either continuously or at discrete points) when the data storage 102 is engaged to the platform processor 100, and locked when the data storage 102 is removed from the platform processor 100.

Figure 6:
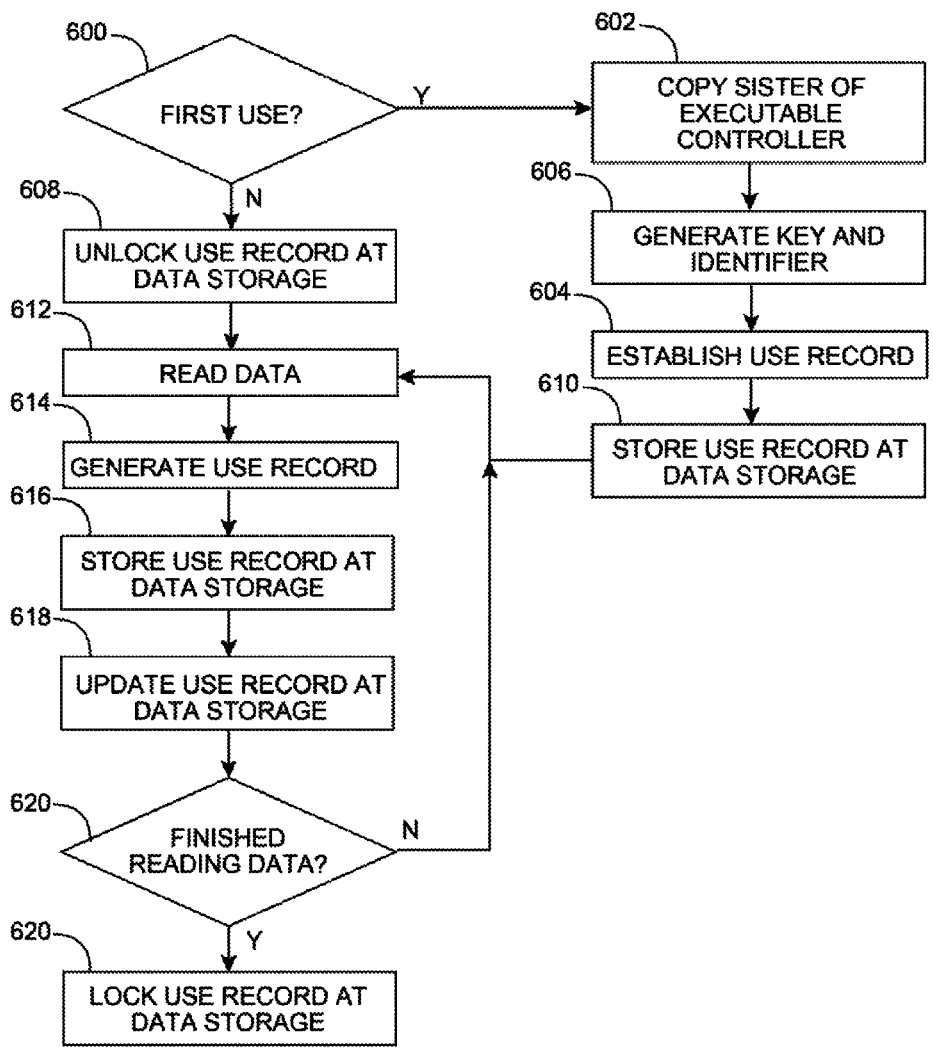
FIG. 6 is a flow chart of a process carried out by a system and device according to an embodiment of the present invention.

In an optional embodiment, illustrated in FIG. 6, the use record is written 610 to the data storage 102, optionally in a writable sub-component 404 of the data storage 102. In a further optional embodiment, the use record and any electronic receipts are encrypted. In one optional embodiment, the use record and/or electronic receipts may be stored at the data storage 102 as well as in at least one additional location, such as a server data storage 302 or a memory 104 associated with the platform processor 100. In another optional embodiment, the use record and/or electronic receipts is stored only at the data storage 102. Optionally, after writing the use record to the data storage 102, the executable controller or the read-write nature of the data storage 102 prevents the alteration or re-writing of the use record. In another optional embodiment, the use record and/or electronic receipts are stored in the wrap and, thus, are secured by the security measures associated with the wrap. In an optional variation on such an embodiment, the executable controller may include some security measure such as a key, identifier, or the like to permit only authenticated transactions and prevent unauthorized viewing, altering, or deleting of the use record and/or electronic receipts.

Referring generally to FIGS. 1-8, the data is read 612 from the data storage 102, optionally by the platform processor 100 at the platform 101. Optionally, the use record (e.g. a time recorded, a play or viewing deducted, credit or credits deducted, or the like) may be updated in real time to reflect that the data is being read. Similarly, an electronic receipt may be generated to record the use/access to the data. It is noted that in an optional embodiment, the wrapped data may represent an account (such as an account identifier, credit card number, or the like) and/or authorization to use an account (such as a key, password, or the like).

In this manner, the wrapped data may be used to conduct a financial transaction. For example, in an optional embodiment, a platform 101 may be a mobile telephone, the data storage 102 may be a memory card or memory chip in the mobile telephone, the memory 104 may be the RAM in the mobile telephone, and the wrapped data may include financial account information and a verification key. The wrapped data may be accessed by the platform processor 100 and transmitted to a payment processor such as a point-of-sale terminal, cash register, payment server, or the like. In an optional embodiment, the wrapped financial data may be transmitted in a secure fashion by (a) passing the data via the executable controller on the memory card to the sister of the executable controller in the RAM of the mobile device; (b) passing the data from the sister of the executable controller in the RAM of the mobile device to a sister of the executable controller in the RAM of the payment processor (e.g., the point-of-sale terminal, cash register, payment server, or the like); and (c) passing the data from the sister of the executable controller in the RAM of the payment processor into the data storage of the receiving device where the financial transaction may be processed. In turn, after the financial transaction is processed, e.g., payment is accepted, the use record may be updated and/or an electronic receipt may be stored at the mobile device by (a) passing updates to the use record and/or electronic receipt via the executable controller in the data storage of the payment processor (e.g., point-of-sale terminal, cash register, payment server, or the like) to the sister of the executable controller in the RAM of the payment processor; (b) passing the data from the sister of the executable controller in the RAM of the payment processor to a sister of the executable controller in the RAM of the mobile device; and (c) passing the data from the sister of the executable controller in the RAM of the mobile device into the data storage of the mobile device where the use record may be updated and electronic receipt stored, optionally secured by the wrap. After updating, the use record may be "locked" and after storing the electronic receipt inside the wrap, the wrap may be "closed."

Where the data includes a game, the outcome of the game may depend, at least in part, on one or more random numbers generated by the platform processor 100 or server processor 300. In an optional embodiment, a random number generator may be included in the executable controller stored at the data storage 102 and/or a sister of the executable controller stored in memory 104 at the platform 101 or stored in server memory 304 at the server 301. In one such embodiment, the consequence is that the random number generator through which the outcome is determined is stored separately from the game of chance itself. In such an embodiment, the random number generator and/or the game of chance may be compatible only with certain games of chance or random number generators, respectively, for security and accounting reasons.

In an optional embodiment in which the data includes a game, the outcome of the game of chance results in a win, loss, or, in some optional embodiments, a push. In a wagering game, the wager is resolved; this may include the awarding of credits for a win, collecting the wager for a loss, and returning the wager for a push. The use record may be updated 618 in any manner, including periodic, real time, or any other fashion. In one optional embodiment, the use record may be updated with each outcome. In another optional embodiment, the use record is "locked" from alteration or re-writing; in such an optional embodiment, a temporary use record may be maintained as credits are awarded and collected during game play and this temporary use record is stored in a use record. In yet another optional embodiment, the use record is updated at a predetermined point, such as at the end of a gaming session.

For example, in an optional embodiment in which the data includes a game as illustrated in FIG. 7, the use record is stored at a server data storage 302 in a record associated with the data storage 102. As noted above, the association between the record and the data storage 102 may be on the basis of a randomly generated identifier. During game play, the credits lost or won during the game of chance are tracked by the executable controller and/or sister of an executable controller and may be temporarily stored 710 at the data storage. At the end of game play, the new use record is communicated 712 to the server data storage 302. At the next game session, play is initiated with the new use record. It is noted that the step of communicating the use record could take many different forms. For example, the platform processor 100 may extract the use record from the data storage 102 and transmit the use record to the server 301 or, in an alternate optional embodiment, the server 301 may extract the use record from the data storage 102, bypassing the platform processor 100.

Referring generally to FIGS. 1-8, in an optional embodiment, as the data is played or viewed, a use record may be generated 614. As an example, the use record may include data such as the time and date the data was read from the data storage 102, the duration that the data was read from the data storage 102, the quantity of times the data was read from the data storage, or the like. Optionally, as illustrated in FIG. 6, this use record is written 616 to the data storage 102. In a further optional embodiment, illustrated in FIG. 7, in which the system includes a server 301, the use record may be communicated 712 to the server 301. The communication of the use record to the server 301 may take place in real time, periodically, upon demand, or on any other basis. For example, in one optional embodiment, the use record is communicated 712 to the server 301 when the data is finished.

Referring generally to FIGS. 1-8, in an optional embodiment, the player may signal that the data is finished; in one example, the user may actuate an "exit" or "disconnect" button. In an optional embodiment in which a use record is stored on the data storage 102, the signal of the end of game play 620 may cause the executable controller and/or sister of the executable controller to finally update the use record and "lock" 620 the use record and/or the data from being altered or rewritten until the data storage 102 is again engaged to a platform processor 100 and the executable controller and/or sister of the executable controller unlock 608 the data storage 102. As noted above, the executable controller stored at the data storage 102 may also communicate with executable sensors in the form of software or firmware to determine whether the data storage 102 is connected to the platform and, upon disconnection from the platform, lock the data and/or the use record. Optionally, sensors may lock the media content and/or use record even if the programs instructions fail to receive an "exit" or "disconnect" command. As noted above, in an optional embodiment, the data storage 102 may include a power source, such as a battery backup, which permits the executable controller and/or sister of the executable controller to write a final update in the event that the data storage 102 is disconnected from the platform 101 or loses power from the platform 101. In one such optional embodiment, the final update also includes the state of the data used by the platform so that the data may be resumed uninterrupted when the data storage 102 is reconnected or power is restored. For example, where the data is streamed (e.g., a movie, song, or the like), the final update may include the exact place where the streaming was interrupted. Where the data includes a game program, the final update may include the game state, including the random number generator seed, at the time the game was interrupted.

In an optional embodiment, such as that illustrated in FIG. 7, in which a server data storage 302 stores use record and/or use record, the end of the data (whether signaled by the user or otherwise detected) may trigger the communication 712 of the use record to the server data storage 302. Optionally, the use record may be locked 714 at the server data storage 302 from being altered or rewritten until the data storage 102 is engaged to a platform processor 100 and an executable controller notifies the server data storage 302 that the associated data storage 102 is engaged and that the use record may be unlocked 706.

Example embodiments are now described in greater detail. These embodiments should be construed as exemplary only and their description herein should not be interpreted as limiting the alternative embodiments described above or recited in the claims presented.

In one example embodiment, the data storage 102 is a removable flash memory connectable to a platform 101 through a USB port or data card slot. The wrap on the data storage 102 is partitioned into at least three sub-components with one sub-component storing data, one sub-component storing an executable controller or an installer for installing an executable controller (depending on the optional embodiment), and one sub-component containing writable storage.

When the data storage 102 is engaged to a platform 101, the platform processor 100 executes the executable controller, or executes the installer to install the executable controller or a sister of the executable controller in a memory 104 associated with the platform processor 100. In an optional embodiment in which the executable controller is executed from the data storage 102, the executable controller may be executed without installing anything at the memory 104 associated with the platform processor 100. In another optional embodiment in which the executable controller is executed from the data storage 102, the executable controller may be executed while temporarily borrowing memory 104 associated with the platform processor 100 for a sister of the executable controller. Under the direction of the executable controller and optional sister of the executable controller, the platform processor 100 optionally assigns a random identifier to the data storage 102 and generates a key, optionally encrypted, and stores the key on the data storage 102 and in memory 104 at the platform 101.

The platform processor 100 accesses a use record at the data storage 102 via the sister of the executable controller and executable controller. In one such optional embodiment, the use record is created by the platform processor 100. In another optional embodiment, the use record is created and stored on the data storage 102 when the wrap is created. In an optional embodiment, a use record is created by establishing a communication link between the platform and a server and conducting a financial transaction. The use record is stored on the data storage 102 and the executable controller may optionally prevent access to alter or rewrite the use record.

The data is read by the platform processor 100 through the executable controller and optional sister of the executable controller. Optionally, the platform processor 100 plays or displays the data to the user with a media player or viewer separate from the executable controller stored at the data storage 102. For example, in an optional embodiment, data may be read from the data storage 102 and played or viewed using a media player or viewer installed at (and executed from) the platform 101. As the data is read from the data storage 102, the platform processor 100 generates and updates a use record that is stored at the data storage 102. In an optional embodiment, data is read directly from the data storage 102 without storing the data at the memory 104 associated with the platform processor 100.

To adjust the play limit stored in a use record, e.g. to purchase additional views or plays of the data the data storage 102 is engaged to a computer platform. This may or may not be the same platform 101 used to conduct the game of chance. For example, in an optional embodiment, a user may change the play limits for data at a kiosk. Optionally, the kiosk may also be used to add new data to the data storage 102. In one such optional embodiment, the executable controller may direct communication with the kiosk. The kiosk may be a standalone device that has authority to add data alter play limits, or the like, or the kiosk may function as a gateway to a server or other device. Optionally, the executable controller, sister of the executable controller, and/or sensors may conduct integrity checks on the use record to attempt to detect alterations or tampering with the data. The kiosk (or server) verifies the use record and, if the use record is verified, the player is enabled to add to the play limit stored at the use record, optionally in exchange for payment, or the like. After the transaction, the use record is updated at the data storage 102 by the kiosk (directly or under the direction of a server).

In an alternate optional embodiment, the data storage 102 may use the platform 101 to conduct such transactions. For example, in an optional embodiment in which the platform 101 is in the form of a cellular telephone, personal computer, or the like, the platform 101 may be able to directly communicate with a server. In one such optional embodiment, the platform 101 may communicate with a server to verify the use record, adjust play limits, download data or the like.

In another example embodiment, the data storage 102 is a flash memory connectable to a platform 101 through a USB port, data card slot, or the like, or a hard drive or other drive connected through an interface with the motherboard of the platform 101. The wrap on the data storage 102 stores data and includes a sub-component 404 with writable storage. In this optional embodiment, executable controller is stored at a server 301 in communication with the platform processor 100.

When the wrap on the data storage 102 is mounted at a platform 101, an "autorun" stored on a data storage 102 may include executable instructions to run sensors from the memory 104 of the platform 101. The sensors may be copied from a server 301 or the data storage 102. If the sensors deem the platform 101 to be safe, i.e., no anomalies are sensed, the "autorun" may executable instructions that authorize a server 301 to copy a sister of an executable controller to memory 104, such as RAM, associated with the platform processor 100. Alternatively, an "autorun" may cause a sister of an executable controller to be installed from the data storage 102 into the memory 104, such as RAM, associated with the platform processor. The platform processor 100 executes the sister of the executable controller from the memory 104 and the executable controller from the data storage 102. Once the sister of the executable controller establishes a connection with the executable controller on the data storage 102, the data storage 102 is readable by the platform 101 and/or server 301 via the cooperation between the executable controller stored on, and executed from, the data storage 102 and a sister of the executable controller stored on, and executed from, memory 104 at the platform 101.

In another such optional embodiment, the executable controller may cooperate with a sister of the executable controller in server memory 304 at a server 301 communicating with the platform 101. Optionally, a sister of the executable controller may be copied to server memory 304 from server data storage 302 or, alternatively, from the data storage 102 connected to the platform 101 communicating with the server 301. It is contemplated that the sister of the executable controller may be copied to, and executed from, server memory 304 in response to running an "autorun" associated with the wrap stored on a data storage 102 at a platform 101. Likewise, a sister of the executable controller may be removed by a server processor 300 upon detection of an anomaly by executable sensors (described in greater detail above) or may persist in the server memory 304 independent of the executable sensors. That is, in one optional embodiment, when the executable sensors detect an anomaly, a sister of the executable controller may be removed from server memory 304 and the data storage 102 secured. In an alternate optional embodiment, an anomaly may merely result in the data storage 102 being secured.

In an optional embodiment, the executable controller may be executed without storing anything at the memory 104, or by temporarily borrowing memory 104 at a platform 101 for a sister of the executable controller. Under the direction of the executable controller and optional sister of the executable controller, the platform processor 100 and/or server processor 300 assigns a random identifier to the data storage 102 and generates a key, optionally encrypted, and stores the key on the data storage 102 and in memory 104 associated with a platform processor 100 and/or server memory 304 (and/or server data storage 302) associated with a server processor 300.

In one optional embodiment, the platform processor 100 establishes a use record, such as by communicating with a server 301 and conducting a financial transaction. In another optional embodiment, the server processor 300 establishes a use record, such as by conducting a financial transaction. The use record is stored in a record on the server 301 (such as at server data storage 302), associated with the data storage 102, and stored at the data storage 102. Optionally, the use record at the data storage 102 is treated as a backup and stores a limited number of transactions, such as the most recent transactions, while the use record stored on the server 301 stores all transactions. In such an optional embodiment, it is contemplated that the use record may be updated in batches or in real-time, i.e., changes or updates to the use record made at either the server 301 or the platform 101 may be propagated in real time to the other via the sister of the executable controller in the server memory 304 at the server 301 communicating with the sister of the executable controller in the memory of the platform 101.

The wrapped data are read by the platform processor 100. As the data, executable game program, or the like, are read, the platform processor 100 generates and updates a use record that is stored at the data storage 102 and the server data storage 302. Optionally, the record is updated in real time. As suggested above, in an optional embodiment, the use record stored at the data storage 102 may be truncated with, for example, old transactions deleted as new transactions are recorded. In this respect, the data storage 102 or at least the sub-component of the data storage 102 storing the use record may be readable and writable.

To adjust the use record, e.g. to purchase additional plays or views of the data the data storage 102 may be engaged to a computer platform. This may or may not be the same platform 101 used to read wrapped data from the data storage 102, e.g., play media content, execute game programs, and so forth. In one such optional embodiment, the executable controller communicates the identifier associated with the wrap on the data storage 102 (and optionally a key associated with the data storage 102) to a server 301. The server 301 verifies the use record in the wrap at the data storage 102 against the use record at the server 301 and, if the use record is verified, the player is enabled to change the play limits stored in the use record, add data or the like. After the credit transaction, the updated use record is stored at the server 301 in a record associated with the data storage 102.

Figure 8:
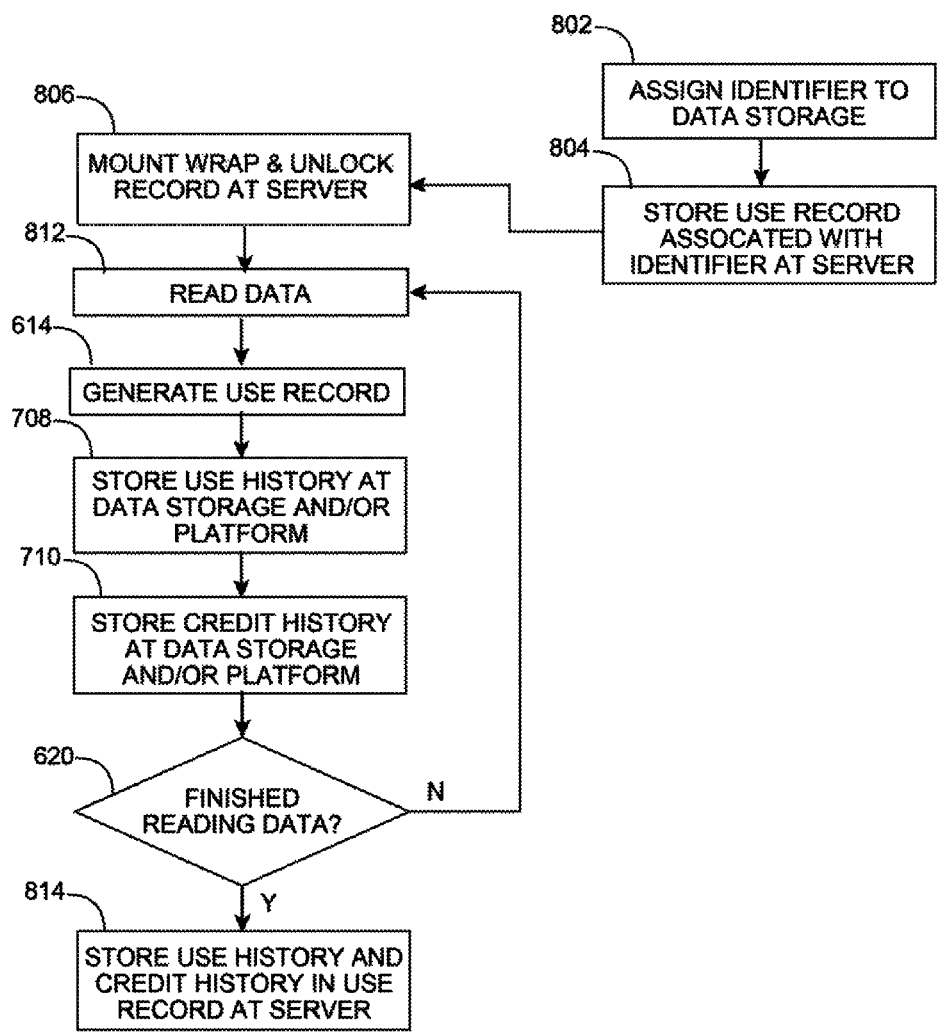
FIG. 8 is a flow chart of a process carried out by a system and device according to an embodiment of the present invention.

In yet another example embodiment, illustrated in FIG. 8, the data storage 102 may store wrapped data but does not store an executable controller or an installer. The data storage 102 is assigned 802 a unique identifier that is associated with a record stored 804 at the server data storage 302 associated with the server 301. The record associated with the unique identifier may optionally include a use record (optionally including play limits and the like). The use record may include separate play limits for each unit of data and/or play limits applicable to all data, such as media content.

The data storage 102 is connected 806 to the platform 101, either in a fixed or removable manner, such as through a USB port, card slot, or the like. The platform 101 already stores the executable controller in memory 104 associated with the platform 101. Alternatively, the platform 101 communicates with a server 301 that stores an executable controller or sister of the executable controller in server memory 304 associated with the server 301. In yet a further optional embodiment, a sister of the executable controller is copied from the server 301 to memory 104 at the platform 101. Optionally, the platform 101 is configured for use with the data storage 102 such as through security procedures that allow the platform 101 to verify the data storage 102 and the data storage 102 to verify the platform 101. The platform 101 communicates with a server 301 through a network, such as a local area network ("LAN"), wireless connection, or the like, that allows the server 301 to communicate directly or through the platform 101 with the data storage 102.

In this example embodiment, by mounting 806 the data storage 102 at the platform 101, the data storage 102 enables the transfer of data (such as a use record) from the server 301 to the platform 101, or otherwise unlocks the record stored at the server 301. The wrapped data is read 812.

In an optional embodiment in which the use record includes a use history and a credit history, the use history is generated 614 and stored 708, at least temporarily, at the data storage 102 and/or at the platform 101. Similarly, the credit history may be tracked and stored 710, at least temporarily, at the data storage 102 and/or the platform 101. Optionally, electronic receipts may be generated as credits are purchased, used, wagered, or otherwise transacted. The use record, e.g., use history and credit history as well as any electronic receipts, are transferred 814 to the server 301 at a predetermined point, such as when the data is finished 620 or the data storage 102 is disconnected from the platform 101. Optionally, a portion or all of the data transferred to the server 301 are backed up at the platform 101 and/or the data storage 102.

In yet another optional example, the data storage 102 is connected to the platform 101 which communicates with a server 301 and the "autorun" prepares the platform 101. An installer in the wrap copies a sister of the executable controller to server memory 304 associated with the server 301. The executable controller stored on, and executed by the server processor 300 from, the data storage 102 cooperates with the sister of the executable controller stored on, and executed by the server processor 300 from, server memory 304 associated with the server 301. In such an optional embodiment, the platform 101 serves primarily as a display device and input device, e.g., a dumb platform 101. In an optional embodiment in which the data is an executable game utilizing a random number generator, the random number generator may be executed at the server 301 either as a separate routine, or as part of the sister of the executable controller, or as part of the game program extracted from the data storage 102 by the server processor 300.

The data is passed from the data storage 102 to the server processor 300 via the executable controller in cooperation with the sister of the executable controller. Optionally, a use record consisting of a use history and a credit history is stored at the data storage 102 in real time as the data is delivered to the platform 101. Again, to be clear, in this example, the server processor 300 at the server 301 utilize a sister of the executable controller at server memory 304 in cooperation with an executable controller at a data storage 102 to deliver data from the data storage 102 to the platform 101. In one such optional embodiment, the server processor 300 generates a use history and directly passes the use history, via the sister of the executable controller to the executable controller, to the data storage 102, thereby bypassing the platform processor 100 and memory 104 at the platform 101. Again, this may occur in real time. Optionally, the use history may also be stored at server data storage 302. In one such optional embodiment, the use history at the data storage 102 may be erased serially so that the use history at the data storage 102 only stores the most recent transactions and/or events, while the use history at the server data storage 302 stores the complete history.

Figure 9:
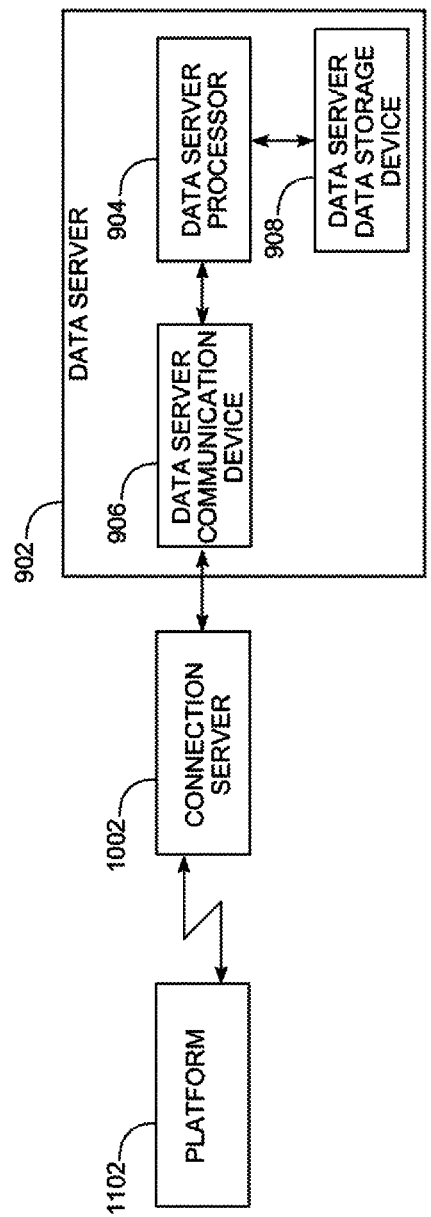
FIG. 9 is a block diagram of a system according to an embodiment of the present invention.

As noted above, data may be wrapped on the platform and/or server to secure the data from unauthorized access. For purposes of avoiding confusion regarding which devices are interchangeable, components illustrated in FIG. 9 are numbered anew, even where those components share the same name as in earlier figures. This should be interpreted as allowing, but not necessarily requiring, that the devices illustrated in FIG. 9 may share the characteristics of devices previously described with respect to earlier figures.

Figure 10A:
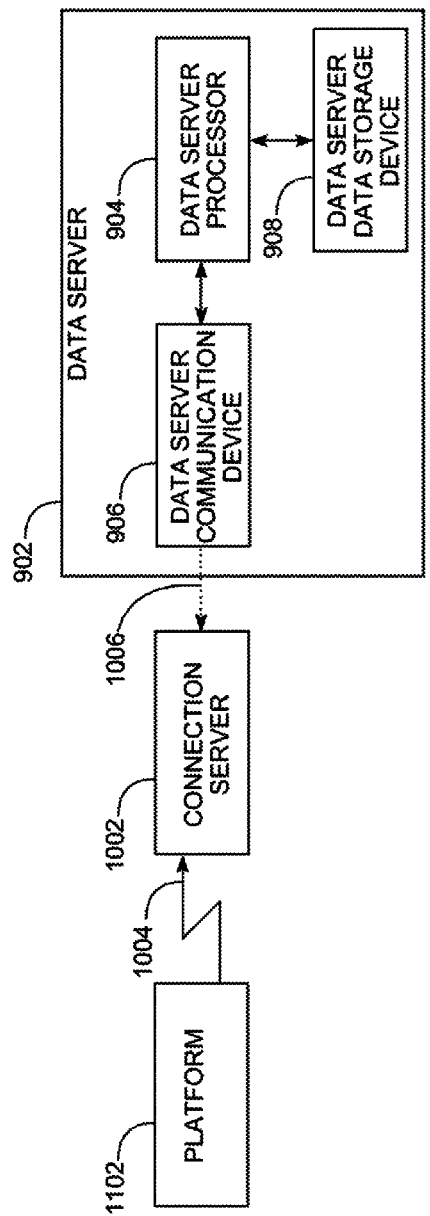
FIG. 10A is a block diagram of a system according to an embodiment of the present invention.
Figure 10B:
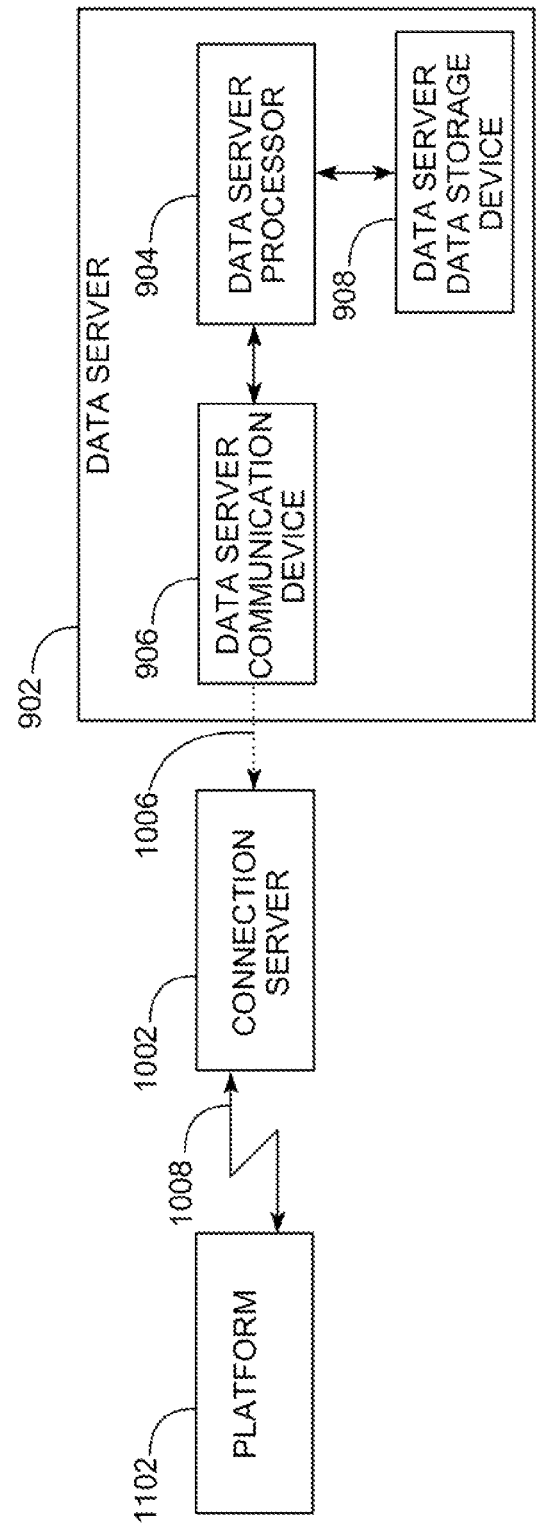
FIG. 10B is a block diagram of a system according to an embodiment of the present invention.
Figure 10C:
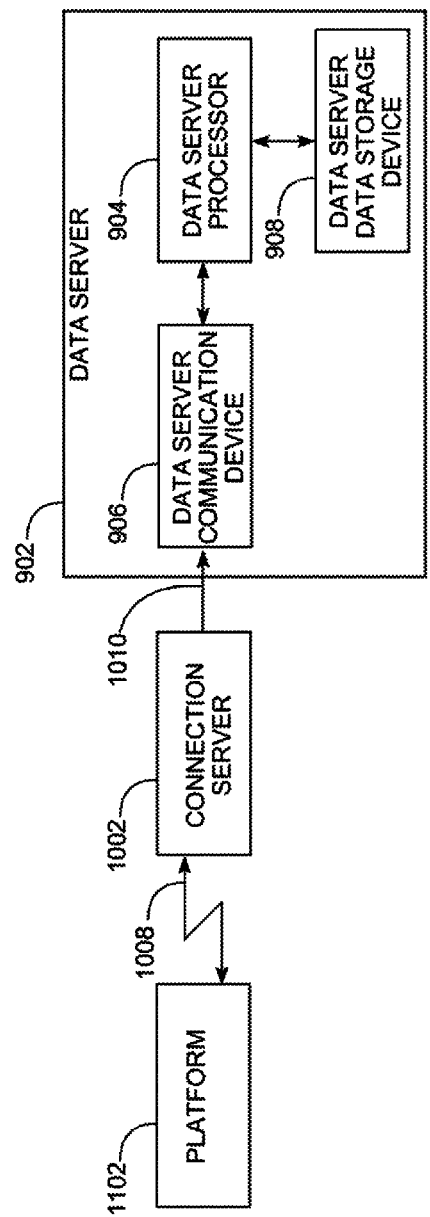
FIG. 10C is a block diagram of a system according to an embodiment of the present invention.
Figure 10D:
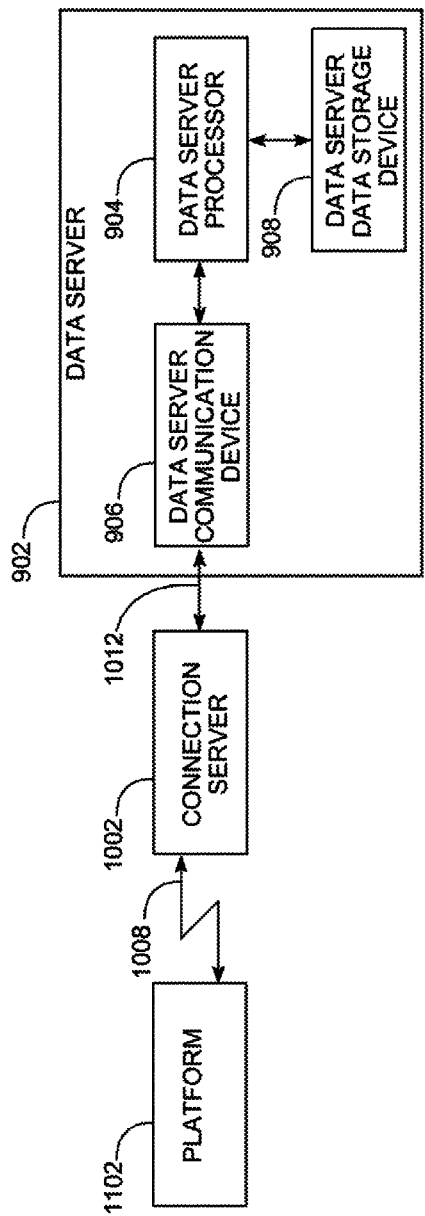
FIG. 10D is a block diagram of a system according to an embodiment of the present invention.
Figure 11:
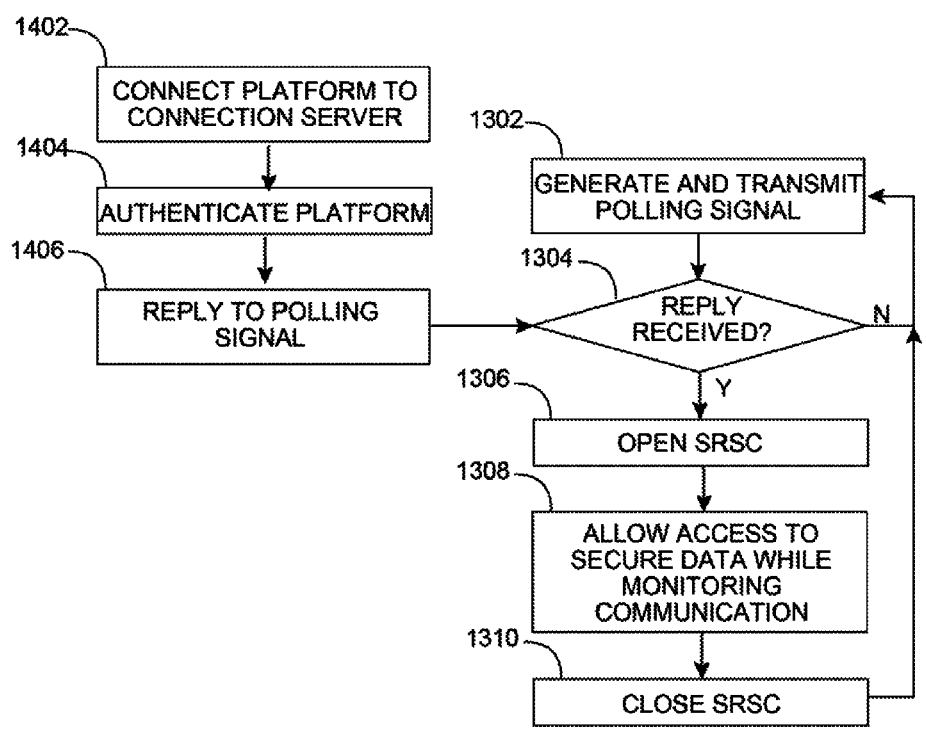
FIG. 11 is a flow chart of a process carried out by a system and device according to an embodiment of the present invention.

Referring now to FIGS. 9-11, the present invention may additionally or alternatively include certain improvements in a server. The servers (referred to herein as a data server 902 and a connection server 1002) may be managed servers as that term is used conventionally, i.e., could be housed and maintained by a third party. In an optional embodiment, a benefit of the various embodiments of the present invention is that secured data may be stored on a data server 902 managed by a third party because neither the third party nor a hacker using the third party's infrastructure would have any advantage in gaining access to the secured data over an outside hacker. As described in greater detail below, the data server 902 has normally closed ports which are only opened when a connection server 1002 presents an authenticated request for access to the secured data. A data server 902 would, in this optional embodiment, be configured to reject any request originating from a device or location other than a connection server 1002 within the system and refuse to open a port for access to the secured data. Additionally or alternatively, when the data server 902 opens a port in this optional embodiment, the port address is randomly generated and hidden from the connection server 1002. Thus, a hacker may be thwarted by his or her inability to find an open port and, even if an open port may be found, would be unable to access secured data because the request to access the data would originate from a device other than a connection server 1002.

More specifically, in one such optional embodiment, a data server 902 and connection server 1002 cooperate to secure the data server 902 itself from unauthorized access. As an overview, an embodiment of the present system includes one or more servers 902 in communication with one or more connection servers 1002. The connection servers 1002 may serve any purpose, but may be viewed as gateways for accessing the server(s) 902. Thus, it should be noted that the platform(s) 1102 illustrated in FIG. 9 could store a wrap as described above, and connection server(s) 1002 illustrated in FIG. 9 could communicate with the platform(s) 1102 illustrated in FIG. 9 using sister-to-sister communication as described above. Alternatively, a different method may be used to connect the platform(s) 1102 and connection server(s) 1002, including conventional network and communication protocols. For example, in an optional embodiment, the platform 1102 could be a conventional device enabled for communication via the Internet using a wired or wireless communication device, and the connection server 1002 may be a conventional world wide web server.

The data server 902 includes a data server processor 904 in communication with a data server communication device 906 and a data server data storage device 908. The data server communication device 906 is configured for communication with a connection server 1002. In an optional embodiment, the data server communication device 906 is not connected to the Internet or any similar open network. That is, in an optional embodiment, the connection server 1002 is the only pathway to the data server 902 from an open network, e.g., the Internet. In such an optional embodiment, the only physical connection with the data server 902 may be to one or more connection servers 1002.

Referring to FIGS. 9-11, to aid in this, there exists no "always-on" open connection between the connection server 1002 and the data server 902. Rather, the data server processor 904 assigns a polling port for use by the data server communication device 906. The data server processor 904 generates and transmits 1302 to the connection server 1002 a polling signal and monitors 1304 for a reply signal. The polling signal may be a regular periodic signal, although it does not necessarily need to be regular or periodic. In an optional embodiment, no commands or communications through the polling port are permitted other than the polling signal and reply. In this regard, an optional embodiment may include closing the polling port between discrete polling signals (including a period permitted for reply) and the ensuing discrete polling signal.

When a reply is received at the data server 902 to the polling signal, the data server 902 may open 1306 a secure random socket connection ("SRSC"). An SRSC, for purposes of this description, is a communication port used by the server communication device 906 with an address that is randomly selected by the data server processor 904 and hidden from the connection server 1002 until after the SRSC is opened. In an optional embodiment, a connection server 1002 also uses a secret port address. In an optional embodiment, the port address used by the connection server 1002 is known only to the connection server 1002 and the data server 902. Thus, in one optional embodiment, the connection server 1002 sends a properly formatted (and optionally authenticated) reply to the polling signal and opens its secret port. At substantially the same time, the data server 902 randomly selects a port address for the SRSC and connects to the connection server 1002 using the connection server's secret port. To summarize, the port used by the data server communication device 906 at the data server 902 is the SRSC with a randomly selected, hidden address, while the port used by the connection server 1002 is a secret port with an address known only to the connection server 1002 and the data server 902. In this manner, the connection server 1002 passes a first level of authentication by merely replying to the polling signal and being available at the secret port address. If, for example, the connection server 1002 fails to reply to the polling signal in the correct fashion and/or within a defined time window of a polling signal, the data server 902 could assume the "reply" was not sent from a connection server 1002, but from a possibly malicious device. Similarly, if, for example, the connection server 1002 fails to be available at the secret port address within a specified time after replying, the data server 902 could assume the "reply"

was not sent from a connection server 1002. It is contemplated that additional checks, verifications, and authentications may occur between the data server 902 and connection server 1002, either before, during, or after the reply to the polling signal and/or the opening of the SRSC occurs to authenticate that the connection server 1002 is a trusted device.

The SRSC may be used by the connection server 1002 to access 1308 secured data on the data server 902. In an optional embodiment, any SRSC is used only for a limited time and/or limited number of transactions and/or limited amount of access after which the SRSC is closed 1310. For example, in an optional embodiment, the secured data includes data files (although the exact format does not matter, the data files could be, for example, documents, movies, music, images, or the like). In this regard, an SRSC may be static or dynamic. For example, in one optional embodiment, a dynamic SRSC is closed after each access occurs, such as to download, upload, update, copy, or the like, and a new SRSC must be opened to access the next file. However, in an optional embodiment, once the platform 1102 and connection server 1002 have been verified, the process of closing an SRSC after accessing a file and opening a new SRSC for the next access command may be performed without again verifying the platform 1102 and/or connection server 1002. That is, this process may be essentially invisible to the user, who may be unaware that each file is downloaded from the data server 902 using a different dynamically assigned SRSC. From the point of view of hackers, however, using a different SRSC address, which is hidden and randomly selected, for each access of secured data may frustrate efforts to hack into the secured data.

In an optional embodiment, the SRSC may be monitored 1308 by the data server 902 to reduce the risk of unauthorized access. For example, in one optional embodiment, the SRSC may be monitored by the data server 902 for an idle connection. As may be appreciated, an open idle connection could risk discovery by a hacker. In an optional embodiment, an idle connection may trigger the data server 902 to close an SRSC. In an additional or alternative embodiment, commands directed to the data server 902 (from or through the connection server 1002) may be monitored and compared to prohibited commands. For example, downloading a document from a user's directory may be permitted but attempting to browse other users' directories may be prohibited. Receipt of a prohibited command may likewise trigger the data server 902 to close an SRSC. It is contemplated that other characteristics of the connection and communication between the data server 902 and connection server 1002 may also be monitored and trigger the data server 902 to close the SRSC, e.g., by looking for signs characteristic of hackers, viruses, key loggers, bots, debuggers, or the like.

Returning to FIG. 9, a platform 1102 may be included in the system. A platform 1102 may take any form, including a personal computer, mobile device, tablet device, PDA, embedded device, cellular telephone, or the like. As may be appreciated, a connection server 1002 may be utilized by multiple platforms 1102, e.g., the connection server 1002 may be a node within a network of platforms 1102.

In an optional embodiment, a platform 1102 may utilize an interface to establish a connection to the data server 902 via a connection server 1002. This interface may take any form, including a web browser, a custom application, a function integrated into an application or an operating system, or any other form. Similarly, the interface may be embodied in software, firmware, or hardware. In an optional embodiment, the interface may be secured inside an executable wrap, as discussed above, and work with, or be integrated into, an executable controller which creates a sister of itself in the memory of the platform 1102 to establish a secure path for accessing the contents of the wrap including, for example, the interface.

For example, drawing from the discussion above, the wrap and sister of the executable controller stored at the platform 1102 may be executed by a platform processor 1104 to secure and monitor the platform 1102 and connect 1402 to a connection server 1002. After the connection between the platform 1102 and connection server 1002 is established, the platform may be authenticated 1404. An illustration of a system in this state is shown in FIG. 10A. In this state, a platform 1102 is connected 1004 to a connection server 1002, optionally using a hidden port at the connection server 1002, although an SRSC could also be used at the connection server 1002 at this point. In this example, however, it is contemplated that an ordinary public, open port, or a hidden port, or an SRSC could be used at this point since the platform 1102 is merely connecting to a connection server 1002 and transmitting enough information to authenticate the platform and no secured data is yet being accessed. As illustrated in FIG. 10A, a polling signal 1006 may be transmitted from a data server 902 to each connection server 1002 within the system.

In an optional embodiment, a first segment of authentication takes place in accessing the connection server. In an optional embodiment, this first segment includes authenticating a password, code, personal identification number ("PIN"), or other unique identifier. It is contemplated that actual input may be required, or the unique identifier may be stored inside the wrap.

In an optional embodiment, the first segment of authenticating the platform 1102 may lead to, or be accompanied by, a second segment, which may include communicating with the user via the platform 1102 or other device to obtain confirmation that the user has requested access to the connection server 1002. For example, in one optional embodiment, the connection server 1002 may send, or cause to be sent, an email, short message service ("SMS") text message, or other communication to an account identified by the user. Replying to the message from the identified account may serve as an additional layer of authentication.

In an optional embodiment, the additional layer of authentication may serve to provide access to the connection server 1002 but also to unlock the interface. For example, in an optional embodiment, passing authentication may allow the connection server to provide a key (such as a code or part of a code) necessary for the sister of the executable controller to make an interface accessible to the platform 1102. More concretely, using the examples given above, starting an application or operating system feature using the present invention may launch the connection application which transmits the first part of a code to a connection server 1002. It is contemplated that the connection established by the connection server 1002 may be a dynamic SRSC insofar as the connection application may alert the connection server 1002 to the impending communication and the connection server 1002 may open a randomly generated, hidden address for connecting to the platform 1102. Alternatively, the connection established by the connection server 1002 may be a hidden port, but not an SRSC as that term is used in this description, insofar as the port address is not randomly generated, but selected from a list of at least one hidden address. While the selection of a hidden address from a list could be done in a random fashion, the list would be, in such an optional embodiment, predefined.

In this optional embodiment, authentication of the first part of the code occurs at the connection server 1002 which maintains enough information to authenticate platforms 902 but otherwise includes no data that would be useful, alone, to access the secured data if hacked or stolen. In this example, a unique identifier associated with each executable wrap and data necessary to authenticate the first part of the code and initiate the second part of the authentication, if any, may be stored at the connection server 1002.

Upon authentication of the code by the connection server 1002, the connection server 1002 may send an email to an identified account. Replying to the email from the identified account may cause the connection server 1002 to transmit a code (or the second part of the initial code) which allows the interface (referred to above as a menu page) to be accessed from the executable wrap on the platform 1102.

FIG. 10B illustrates an example of the state of a system after authentication has occurred and a connection 1008 has been established between the platform 902 and a connection server 1002. At this point, it is contemplated that communication between the platform 1102 and the connection server 1002 may be via an SRSC opened by the connection server 1002 during or after authentication. That is, after initially connecting to and beginning the authentication process (using either an open port, a hidden port, or an SRSC), the connection server 1002 may open an SRSC (e.g., a port with a randomly generated port address which is hidden from the platform 1102) to complete the authentication process and transmit any secured data from the data server 902. For example, any keys to open an interface, regardless of how they are sent, may be sent from an SRSC on the connection server 1002. Again, it is noted that FIG. 10B includes a polling signal 1006 transmitted from a data server 902 to a connection server 1002.

Turning to FIGS. 10C and 11, once the platform 1102 is authenticated, the connection server 1002 may 1406 transmit a reply signal 1010 to the polling signal. The connection server 1002 may be authenticated, as discussed above, and the data server 902 may open 1310 an SRSC to connect 1012 to the connection server 1002 as shown in FIG. 10D. At this point, the connection server 1002 may merely function as a pass-through to transmit commands from the platform 1102 to the data server 902 and transmit secure data to and from the data server 902. As may be appreciated, depending on the use, permitted commands may merely include streaming or downloading commands, such as for a movie or music service, or may include uploading and downloading commands, such as for remote storage, cloud storage, or the like. As noted above, communication between the data server 902 and a connection server 1002 (which, in this example, merely passes commands from the platform 902) may be monitored and the SRSC may be closed if anomalies are detected in the commands, the connection becomes idle, or the like. Similarly, the data server 902 may dynamically close and open SRSCs as access occurs, thereby providing a moving target for any possible malicious attacks.

In a particular use of the system, the data may take the form of communication data. That is, in one optional embodiment, rather than accessing data at the data server 902, the platform 1102 may use the connection server 1002 and data server 902 to pass communication data, such as email, instant messages, SMS messages, voice over internet protocol ("VOIP"), voice over publicly switched telephone network ("PSTN"), voice over cellular network, or other communication data. In one such optional embodiment, the connection server 1002 functions to authenticate the platform 1102, open a connection with the data server 902, and acts as a pass-through or go-between for communication passing between the data server 902 and platform 1102. In an optional embodiment, the connection server 1002 does not store any of the communications. In a further optional embodiment described in greater detail below, firewalls on the connection between the platform 1102 and data server 902, the connection between the connection server 1002 and data server, or both connections, may scrub both the connection server port address and SRSC address, as well as any residual or transitory stored data, from the connection server 1002.

Figure 13:
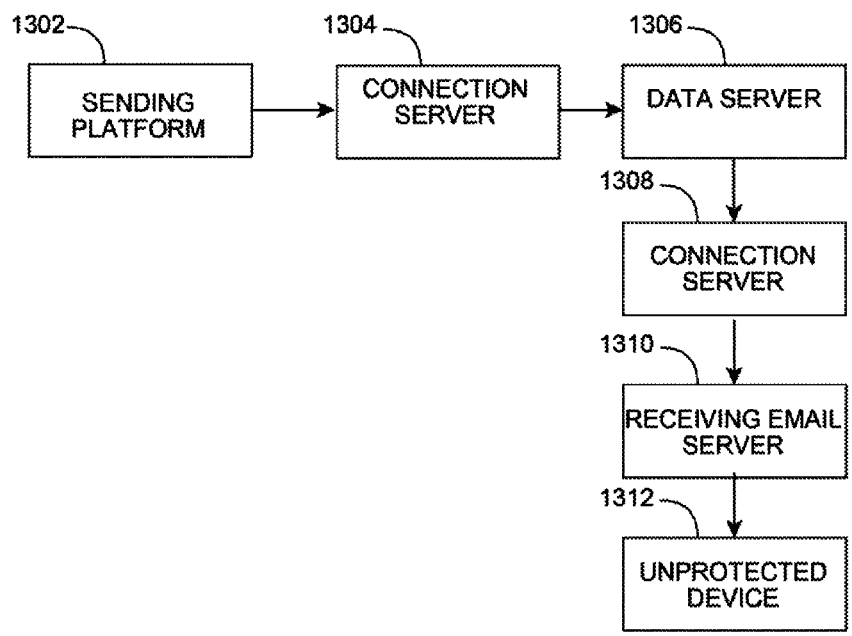
FIG. 13 is a block diagram of a system according to an embodiment of the present invention.
Figure 14:
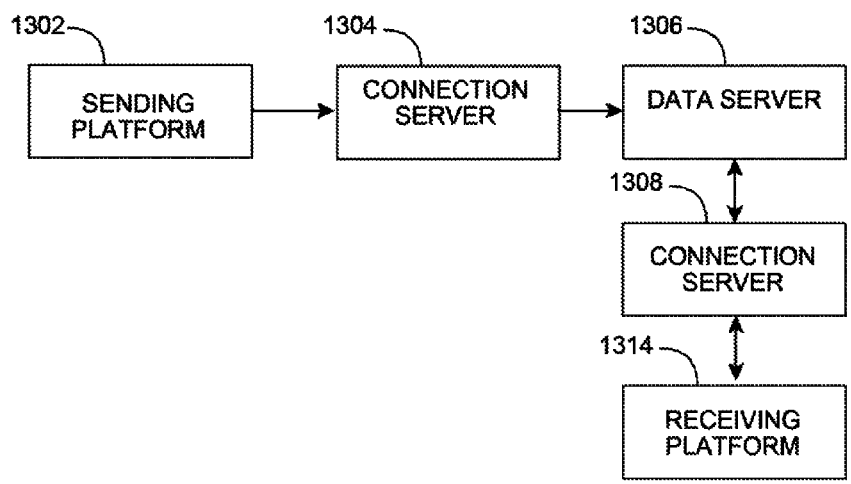
FIG. 14 is a block diagram of a system according to an embodiment of the present invention.

Thus, in one such example illustrated in FIGS. 13 and 14, communications may be sent from a sending platform 1302, through a connection server 1304, to a data server 1306. The data server 1306 then reverses the process, by sending the communication to the recipient through the same or different connection server 1308. In this manner, the recipient can be assured that the source of the communication is a platform 1302 with access to the data server 1306. In one optional embodiment, the connection server 1308 may merely transmit the communication to the recipient's unprotected device or communication server. For example, in the optional embodiment illustrated in FIG. 13, a connection server 1308 may send a communication to the recipient's email server 1310 that the recipient may access from an unprotected device 1312. In an alternate optional embodiment illustrated in FIG. 14, the connection server 1308 may send a communication directly to a protected platform 1314. As may be appreciated, the communications described herein are not limited to discrete packets of data (such as internet or browsing data, email, SMS messages, instant messages, VOIP, or the like), but could include streams of analog or digital data (such as voice over PSTN or voice over cellular network). Thus, the present method could be used for communications that are held until accessed (such as email) or are more-or-less continuous (such as video calling, voice calling, or the like).

Figure 15:
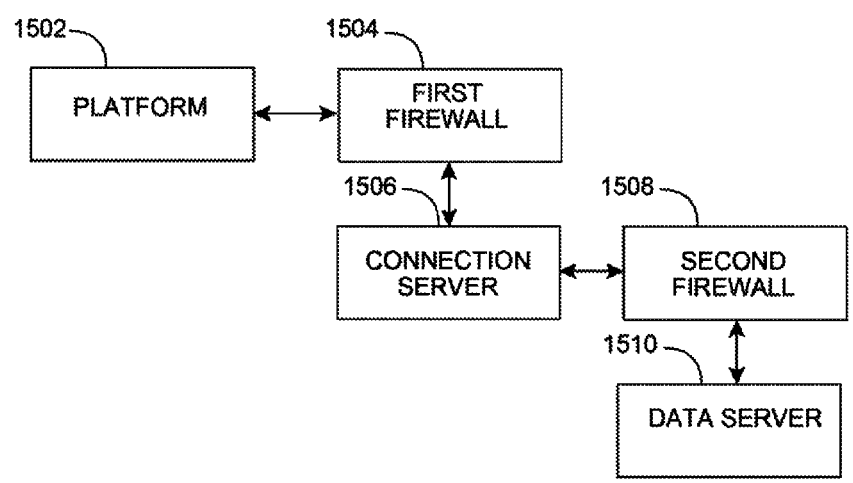
FIG. 15 is a block diagram of a system according to an embodiment of the present invention.
Figure 16:
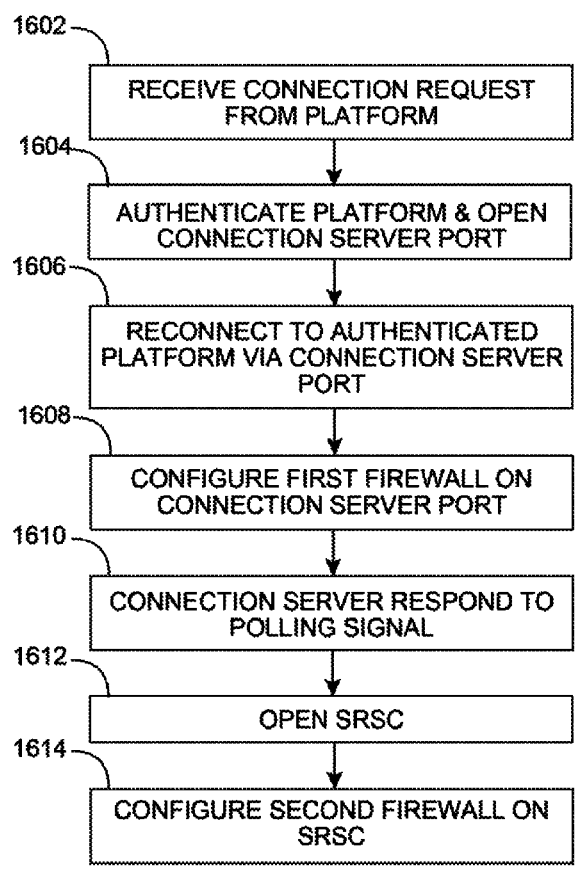
FIG. 16 is a flow chart of a process carried out by a system and device according to an embodiment of the present invention.

In an optional embodiment, any of the systems described herein may incorporate one or more firewalls. For example, in one optional embodiment illustrated in FIG. 15, a first firewall 1504 may be established and configured dynamically between an authenticated platform 1502 and a connection server 1506. As described in FIG. 16, in one such optional embodiment, a connection server 1506 receives 1602 a connection request from a platform 1502. In an optional embodiment, the connection request may be received at a server address that was stored securely inside a wrap, hidden from the user, as described in greater detail above. In response to the connection request, the connection server 1506 authenticates the platform and opens 1604 a connection server port having a connection server port address. In an optional embodiment, the connection server port address may be randomly selected. In a further optional embodiment, the connection server port address is hidden from the platform 1502. The connection server 1506 reconnects 1606 to the authenticated platform 1502 using the connection server port at the connection server port address. As may be appreciated, the reconnection may be initiated by the connection server 1506 or by the authenticated platform 1502 (keeping in mind that if the connection server port address is hidden from the authenticated platform 1502, the connection server 1506 would initiate the reconnection.

A first firewall 1504 is configured 1608 dynamically on the connection between the authenticated platform 1502 and connection server 1506. The first firewall 1504 may be software, firmware, or hardware. If the first firewall 1504 is hardware, the first firewall 1504 may be separate from the connection server 1506 and/or the platform 1502 or may be embedded in the connection server 1506 or the platform 1502. In one optional embodiment, the first firewall 1504 is software running on the connection server 1506. In one such optional embodiment, the connection server 1506 configures the first firewall 1504 dynamically for the connection server port that is used to reconnect to the authenticated platform 1502. In one such optional embodiment, the first firewall 1504 drops all connection requests to the connection server port opened for the authenticated platform 1502, without replying to the connection request. That is, any connection request is merely dropped so that no bandwidth or computing time is used in replying to the connection request. In a further optional embodiment, the first firewall 1504 drops all communication commands directed to the connection port from any device other than the authenticated platform 1502, without replying to the commands. Again, any commands from any source other than the authenticated platform is merely dropped without using bandwidth or computing time to reply to the command. As may be appreciated, a first firewall 1504 configured in such a manner could reduce the impact of denial of service attacks on the connection server 1506.

In addition, a first firewall 1504 may conceal the connection server port that was opened by the connection server 1506 for the authenticated platform 1502. In one such optional embodiment, the first firewall 1504 may merely conceal the connection server port by concealing the connection server port address. In another optional embodiment, the first firewall 1504 may actively misrepresent the status of the connection server port. For example, the first firewall 1504 may indicate that the connection server port is closed even though it is, in fact, open to the authenticated platform 1502. These examples are merely intended to be illustrative and not limiting, since it is contemplated that the first firewall 1504 could be configured to conceal the connection server port in many other ways.

In an optional embodiment, a second firewall 1508 could be configured between the connection server 1506 and the data server 1510. The second firewall 1508 may be dynamically configured on the SRSC opened between the connection server 1506 and data server 1510. In one such optional embodiment, the connection server 1506 may respond 1610 to a polling signal, the data server 1510 may, in response, open 1612 an SRSC for connection to the connection server 1506, and a second firewall 1508 may be dynamically configured 1614 on the SRSC. Again, the second firewall 1508 may be software, firmware, or hardware. In one optional embodiment, the second firewall 1508 is software running on the data server 1510. As above, the second firewall 1508 may be configured to drop without reply all connection requests to the SRSC and drop without reply all commands or communications from any source other than the connection server 1506. As with the first firewall 1504, the second firewall 1508 may conceal the port address of the SRSC and/or actively misrepresent the status of the SRSC port as closed even though it is, in fact, open to the connection server 1504.

In an optional embodiment, the first firewall 1504 and/or the second firewall 1508 may be configured to be dynamically extinguished when the connection server port and/or the SRSC are closed. In one such optional embodiment, when the SRSC is closed, a first firewall 1504 and a second firewall 1508 (in an optional embodiment including such a second firewall 1508) are dynamically extinguished. In an alternate optional embodiment, the first firewall 1504 and/or second firewall 1508 may be reconfigured when an SRSC is closed to allow connection requests from all sources or connection requests from authorized platforms.

In an optional embodiment, a first firewall 1504 and/or a second firewall 1508 may also be commanded to erase any trace data that may exist on the connection server 1506 when an SRSC and/or connection server port is closed. For example, in an optional embodiment, a first firewall 1504 and/or second firewall 1508 may erase the connection server port address, the SRSC address, and/or any other data or communications that may have been stored permanently or temporarily on the connection server 1506. In a further optional embodiment, a first firewall 1504, a second firewall 1508, or any other process may be configured to remove the connection server port address, SRSC address, or any other trace data from the platform and/or data server after each disconnection. In an optional embodiment, certain types of disconnections may be treated differently than other disconnections. For example, different actions may be undertaken if the SRSC is closed due to software sensors in the connection server 1506 and/or data server 1510 cause the disconnection due to unauthorized activity than if the disconnection was merely due to a user-initiated termination. For example, commands from the platform 1502 to the connection server 1506 would pass through a first firewall 1504. In an optional embodiment, the first firewall 1504 monitors the commands and closes the connection server port if any unauthorized commands are received. In one such optional embodiment, the first firewall 1504 erases the connection server port address from the connection server 1506, as well as any data in transit (or temporarily cached) from the data server 1510 at the time of the disconnection. Additionally, to the extent that an SRSC address is stored at the connection server 1506, the SRSC address may also be erased.

In an optional embodiment, a pre-connection layer of authentication may also be provided. Such a step could occur before the platform attempts to connect to a connection server, i.e., could occur before the state illustrated in FIG. 10A. In one such optional embodiment illustrated in FIG. 12, an analysis may be made by a verification server 1202 (which may be a connection server 1002 or data server 902, or may be a separate device) of the nature of the communication from the platform 1102. For example, in one optional embodiment, a verification server 1202 may store user profile records and the communication from the platform 1102 may be compared to a user profile record to determine whether to permit the access. The communication from the platform 1102 that is analyzed may simply be the communication between the platform 1102 and the connection server 1002 or a specific verification request may be transmitted from the platform 1102 to the verification server 1202. The user profile record may contain any number and type of data points, some of which are static and some of which may be dynamic. For example, a user profile record could contain the most recent connection time and location (e.g., based on ISP address, GPS, cellular tower location, or the like). If an anomaly is detected in the current connection time and location compared to the most recent connection time and location, verification may be denied. Thus, if a user logged in from Miami at 2:00 p.m. and attempted to log in from Seattle twenty-seven minutes later, an anomaly would be detected and verification may be denied. It is noted that the user profile record could include multiple data points and verification granted, if a portion of the data points are satisfied, even if other data points are not satisfied. For example, if a user always checks his or her email between the hours of 7:00 a.m. and midnight, and a connection is requested to check the user's email at 3:00 a.m., this data point may count against the user. However, verification may be granted and the connection may be allowed if other data points are satisfied such as the user's location, browsing habits, ISP address, GPS and/or cell tower location, and so forth. In an optional embodiment, verification may be granted and a connection may be allowed if a defined percentage, such as 80%, of the data points stored in the user profile record are satisfied. Because the verification server 1302 determines whether the platform 1102 is allowed a network connection, the platform 1102 in such an optional embodiment may be termed a server-managed device, at least concerning the network connection of the platform 1102.

Figure 12:
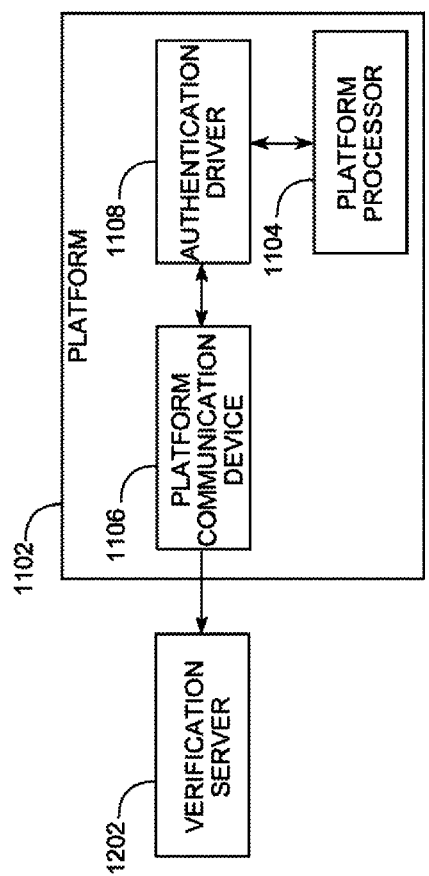
FIG. 12 is a block diagram of a system according to an embodiment of the present invention.

In one example of the present invention illustrated in FIG. 12, a platform 902, such as a cellular telephone or other mobile device, may include software, firmware, or hardware to serve as an authentication driver for the cellular telephone or other mobile device. In such an optional embodiment, the authentication driver 1108 serves as a go-between for the platform processor 1104 and the platform communication device 1106. Again, this could be a hardware device physically interposed between the platform processor 1104 and the platform communication device 1106, or an application or operating system function that regulates communication between the platform processor 1104 and the platform communication device 1106. In one such optional embodiment, a user may initiate a connection. The authentication driver may create a verification request and transmit the verification request to a verification server 1202 using the platform communication device 1102. The verification server 1202 compares the verification request, which could also include the nature and characteristics of how, when, and/or where the verification request was transmitted, to a user profile record. If the verification request is granted, the authentication driver permits the connection to be made using the platform communication device 1102. In the example above, this could lead to a third code or third part of a code, necessary to use the interface to access the data server 902 via the connection server 1002. Alternatively, this could just lead to the platform 1102 establishing a connection to any web server, VPN, or other network, depending on the application. That is, it is contemplated that the verification server and authentication driver described herein could be included in the systems, methods, and devices disclosed and claimed, or any other systems, methods, and/or devices.

While certain embodiments of the present invention have been shown and described it is to be understood that the present invention is subject to many modifications and changes without departing from the spirit and scope of the claims presented herein.

We claim:

1. A system comprising:
   a platform having a platform processor;
   a connection server in communication with said platform having a connection server processor configured to execute program instructions to conduct the steps of:
   receiving a connection request from said platform;
   authenticating said platform;
   opening a connection server port identified by a connection server port address;
   reconnecting to said authenticated platform via said connection server port at said connection server port address;
   dynamically configuring a first firewall interposed between said authenticated platform and said connection server, said first firewall configured to drop all connection requests directed to said connection server port address without replying to said connection requests directed to said connection server port address and drop all commands directed to said connection server port address from sources other than said authenticated platform without replying to said commands directed to said connection server port address from sources other than said authenticated platform; and
   receiving commands from said authenticated platform via said connection server port through said firewall;
   a data server comprising:
   a data server processor;
   a data server communication device controlled by said data server processor and configured for selective communication with said connection server via ports assigned by said data server processor; and
   a data server data storage readable by said data server processor, wherein said data server data storage is adapted to store, in non-volatile storage, secured data and program instructions executable by said data server processor to conduct the steps of:
   generating and transmitting to said connection server a polling signal via a polling port;
   monitoring said polling port for a reply to said polling signal from said connection server, wherein said reply is generated by said connection server as a result of at least one of said commands from said authenticated platform;
   only in response to receiving a reply to said polling signal, opening a secure random socket connection for use by said data server communication device, said secure random socket connection having a secure random socket connection address randomly selected by said data server processor and hidden from said connection server at least until after said secure random socket connection has been opened by said data server processor;
   establishing a connection to said connection server via said data server communication device using said secure random socket connection opened by said data server processor;
   permitting access to said secured data stored on said data server data storage by said connection server via said secure random socket connection, wherein said connection server is configured to pass said secured data to said platform in response to at least one of said commands; and
   closing said secure random socket connection after access by said connection server to said secured data has occurred.

2. The system of claim 1 wherein said program instructions executable by said connection server processor further comprise configuring said first firewall to conceal said connection server port address.

3. The system of claim 1 wherein said program instructions executable by said connection server processor further comprise configuring said first firewall to misrepresent the status of said connection server port as closed.

4. The system of claim 1 wherein said program instructions executable by said connection server processor further comprise dynamically extinguishing said first firewall when said secure random socket connection is closed.

5. The system of claim 1 wherein said program instructions executable by said data server processor further comprise dynamically configuring a second firewall interposed between said connection server and said data server, said second firewall configured to drop all connection requests directed to said secure random socket connection address without replying to said connection requests directed to said secure random socket connection address and drop all commands directed to said secure random socket connection address from sources other than said connection server without replying to said commands directed to said secure random socket connection address from sources other than said connection server.

6. The system of claim 5 wherein said program instructions executable by said data server processor further comprise:
defining commands prohibited in communication between said connection server and said data server;
monitoring commands between the connection server and said data server via said secure random socket connection;
closing said secure random socket connection when said commands include prohibited commands; and
commanding said second firewall to erase said connection server port address and said secure random socket connection address from said connection server after said secure random socket connection is closed.

7. A method for permitting or restricting access to secured data stored on system comprising a platform having a platform processor, a connection server in communication with said platform having a connection server processor, and a data server having a data server processor, a data server communication device controlled by said data server processor and configured for selective communication with a connection server via ports assigned by said data server processor, and a data server data storage readable by said data server processor, wherein said data server data storage is adapted to store, in non-volatile storage, secured data and program instructions executable by said data server processor to conduct a method comprising:
receiving a connection request at said connection server from said platform;
authenticating said platform by said connection server;
opening a connection server port identified by a connection server port address by said connection server;
reconnecting said connection server to said authenticated platform via said connection server port at said connection server port address;
dynamically configuring a first firewall interposed between said authenticated platform and said connection server, said first firewall configured to drop all connection requests directed to said connection server port address without replying to said connection requests directed to said connection server port address and drop all commands directed to said connection server port address from sources other than said authenticated platform without replying to said commands directed to said connection server port address from sources other than said authenticated platform;
receiving commands at said connection server from said authenticated platform via said connection server port through said firewall;
generating a polling signal by said data server;
transmitting said polling signal from said data server to said connection server via a polling port;
monitoring by said data server of said polling port for a reply to said polling signal from said connection server;
only in response to receiving a reply to said polling signal by said data server, opening a secure random socket connection by said data server for use by said data server communication device, said secure random socket connection having a secure random socket connection address randomly selected by said data server processor and hidden from said connection server at least until after said secure random socket connection has been opened by said data server processor;
establishing a connection by said data server to said connection server via said data server communication device using said secure random socket connection opened by said data server processor;
permitting said connection server to access said secured data stored on said data server data storage via said secure random socket connection; and
closing said secure random socket connection by said data server after access by said connection server to said secured data has occurred.

8. The method of claim 7 further comprising configuring said first firewall to conceal said connection server port address.

9. The method of claim 7 further comprising configuring said first firewall to misrepresent the status of said connection server port as closed.

10. The method of claim 7 further comprising dynamically extinguishing said first firewall when said secure random socket connection is closed.

11. The method of claim 7 further comprising dynamically configuring a second firewall interposed between said connection server and said data server, said second firewall configured to drop all connection requests directed to said secure random socket connection address without replying to said connection requests directed to said secure random socket connection address and drop all commands directed to said secure random socket connection address from sources other than said connection server without replying to said commands directed to said secure random socket connection address from sources other than said connection server.

12. The method of claim 11 further comprising:
defining commands prohibited in communication between said connection server and said data server;
monitoring commands between the connection server and said data server via said secure random socket connection;
closing said secure random socket connection when said commands include prohibited commands; and
commanding said second firewall to erase said connection server port address and said secure random socket connection address from said connection server after said secure random socket connection is closed.

13. A system comprising:
a platform having a platform processor;
a connection server in communication with said platform having a connection server processor configured to execute program instructions to conduct the steps of:
receiving a connection request from said platform;
authenticating said platform;
opening a connection server port identified by a connection server port address;
reconnecting to said authenticated platform via said connection server port at said connection server port address; and
communicating between said connection server and said authenticated platform via said connection server port;
a data server comprising:
a data server processor;
a data server communication device controlled by said data server processor and configured for selective communication with said connection server via ports assigned by said data server processor; and
a data server data storage readable by said data server processor, wherein said data server data storage is adapted to store, in non-volatile storage, program instructions executable by said data server processor to conduct the steps of:
generating and transmitting to said connection server a polling signal via a polling port;

monitoring said polling port for a reply to said polling signal from said connection server, wherein said reply is generated by said connection server as a result of said communication with said authenticated platform;

only in response to receiving a reply to said polling signal, opening a secure random socket connection for use by said data server communication device, said secure random socket connection having a secure random socket connection address randomly selected by said data server processor and hidden from said connection server at least until after said secure random socket connection has been opened by said data server processor;

establishing a connection to said connection server via said data server communication device using said secure random socket connection opened by said data server processor;

communicating between said data server and said connection server via said secure random socket connection; and closing said secure random socket connection after communication with said connection server has occurred.

14. The system of claim 13 wherein said program instructions executable by said connection server processor comprise communicating with said data server via said secure random socket connection without storing said communication at said connection server.

15. The system of claim 13 wherein said program instructions executable by said connection server processor comprise communicating with said authenticated platform via said connection server port without storing said communication at said connection server.

16. The system of claim 13 wherein said platform further comprises:

a data storage readable by said platform processor, wherein said data storage is adapted to store, in non-volatile storage, an executable wrap securing data, an executable controller, and an executable sensor, said wrap including instructions to copy said executable sensor and a sister to said executable controller to said memory, wherein said data is secured in said wrap by said sister of said executable controller in said memory cooperating with said executable controller in said data storage to automatically and continuously permit or deny access by said platform processor to data protected by said wrap such that said data protected by said wrap is only accessible to said platform processor when both said sister of said executable controller in said memory and said executable controller in said data storage are accessible, wherein said platform processor can access only said sister of said executable controller and is prevented by said wrap from accessing said executable controller directly and wherein said executable sensor is adapted to monitor at least one of said platform and said data storage for anomalies and, upon detecting an anomaly, deny access to said data secured by said wrap by said executable sensor deleting said sister of said executable controller from said memory upon detecting an anomaly thereby rendering said wrapped data inaccessible to said platform processor which can only access said wrapped data through said sister of said executable controller; and said program instructions executable by said connection server processor further comprise:

generating an electronic receipt by said connection server;

transmitting said electronic receipt by said connection server to said sister of said executable controller;

transmitting said electronic receipt by said sister of said executable controller to said executable controller; and storing said electronic receipt inside said wrap by said executable controller.

17. The system of claim 16 wherein said platform processor is configured to execute program instructions to conduct the steps of:

storing a unique identifier of said platform in said executable controller; and said program instructions executable by said connection server processor further comprise:

receiving said unique identifier from said platform during an initial set up; and authorizing said platform by storing said unique identifier from said platform at said connection server, such that said step of authenticating said platform includes receiving said unique identifier from said executable controller at said platform and comparing said unique identifier to said unique identifier stored at said connection server.

18. The system of claim 16 comprising a plurality of platforms each including a platform processor, wherein each said platform processor is configured to execute program instructions to conduct the steps of:

storing a unique identifier of said platform in said executable controller; and wherein said program instructions executable by said connection server processor further comprise:

including authorization for a plurality of platforms in said electronic receipt;

receiving a unique identifier from each platform within said plurality of platforms during an initial set up for each platform; and authorizing each platform within said plurality of platforms by storing the unique identifier associated with each of said platforms at said connection server, such that said step of authenticating any of said platforms within said plurality of platforms includes receiving said unique identifier from said executable controller of said platform and comparing said unique identifier to said unique identifiers stored at said connection server.

19. The system of claim 13 wherein said program instructions executable by said connection server processor further comprise dynamically configuring a first firewall interposed between said authenticated platform and said connection server, said first firewall configured to drop all connection requests directed to said connection server port address without replying to said connection requests directed to said connection server port address and drop all commands directed to said connection server port address from sources other than said authenticated platform without replying to said commands directed to said connection server port address from sources other than said authenticated platform.

20. The system of claim 13 wherein said program instructions executable by said data server processor further comprise:

dynamically configuring a second firewall interposed between said connection server and said data server, said second firewall configured to drop all connection requests directed to said secure random socket connection address without replying to said connection requests directed to said secure random socket connection address and drop all commands directed to said secure random socket connection address from sources other than said connection server without replying to said commands directed to said secure random socket connection address from sources other than said connection server; and commanding said second firewall to erase said connection server port address and said secure random socket connection address from said connection server after said secure random socket connection is closed.

\* \* \* \* \*